United States Patent
Bae et al.

(10) Patent No.: US 11,906,454 B2
(45) Date of Patent: Feb. 20, 2024

(54) HIGHLY SENSITIVE MICROCALORIMETERS FOR CELLULAR BIOENERGETICS

(71) Applicant: President and Fellows of Harvard College, Cambridge, MA (US)

(72) Inventors: Jinhye Bae, Cambridge, MA (US); Joost J Vlassak, Lexington, MA (US)

(73) Assignee: President and Fellows of Harvard College, Cambridge, MA (US)

( * ) Notice: Subject to any disclaimer, the term of this patent is extended or adjusted under 35 U.S.C. 154(b) by 757 days.

(21) Appl. No.: 16/462,059

(22) PCT Filed: Nov. 13, 2017

(86) PCT No.: PCT/US2017/061293
§ 371 (c)(1),
(2) Date: May 17, 2019

(87) PCT Pub. No.: WO2018/089889
PCT Pub. Date: May 17, 2018

(65) Prior Publication Data
US 2019/0383758 A1  Dec. 19, 2019

Related U.S. Application Data

(60) Provisional application No. 62/420,995, filed on Nov. 11, 2016.

(51) Int. Cl.
*G01N 25/48* (2006.01)
*B01L 7/00* (2006.01)

(52) U.S. Cl.
CPC ............ *G01N 25/4846* (2013.01); *B01L 7/00* (2013.01); *B01L 2300/023* (2013.01); *B01L 2300/0663* (2013.01); *B01L 2300/0848* (2013.01); *B01L 2300/12* (2013.01); *B01L 2300/1805* (2013.01)

(58) Field of Classification Search
None
See application file for complete search history.

(56) References Cited

U.S. PATENT DOCUMENTS

| 8,943,888 B2 * | 2/2015 | Huang | G01F 1/6888 73/204.24 |
| 2009/0305319 A1 * | 12/2009 | Baudenbacher | C12M 41/32 435/287.1 |

OTHER PUBLICATIONS

Dechaumphai et al. "Sub-picowatt resolution calorimetry with niobium nitride thin-film thermometer." Rev. Sci. Instrum. 85, 094903 (2014); https://doi.org/10.1063/1.4895678 Submitted: Jul. 29, 2014 • Accepted: Sep. 1, 2014 • Published Online: Sep. 19, 2014. (Year: 2014).*

Koh et al. "High-sensitivity chip calorimeter platform for sub-nano watt thermalmeasurement," Sensors and Actuators A 241 (2016) 60-65. (Year: 2016).*

(Continued)

*Primary Examiner* — William H. Beisner
(74) *Attorney, Agent, or Firm* — Sheehan Phinney Bass & Green PA

(57) ABSTRACT

A microcalorimeter device capable of measuring cellular bioenergetics and systems that are limited in analytic volume. The microcalorimeter device provides sub-nWatt resolution and even tens of pico-Watt resolution, thus enabling resolution of the metabolic rate of a single cell.

10 Claims, 27 Drawing Sheets

(56) References Cited

OTHER PUBLICATIONS

Lee et al. "High-sensitivity microfluidic calorimeters for biological and chemical applications," PNAS /Sep. 8, 2009 / vol. 106/ No. 36 /15225-15230. (Year: 2009).*

Erik A. Johannessen et al. "A Suspended Membrane Nanocalorimeter for Ultralow Volume Bioanalysis," IEEE Transactions on Nanobioscience, vol. 1, No. 1, Mar. 2002, pp. 29-36. (Year: 2002).*

\* cited by examiner

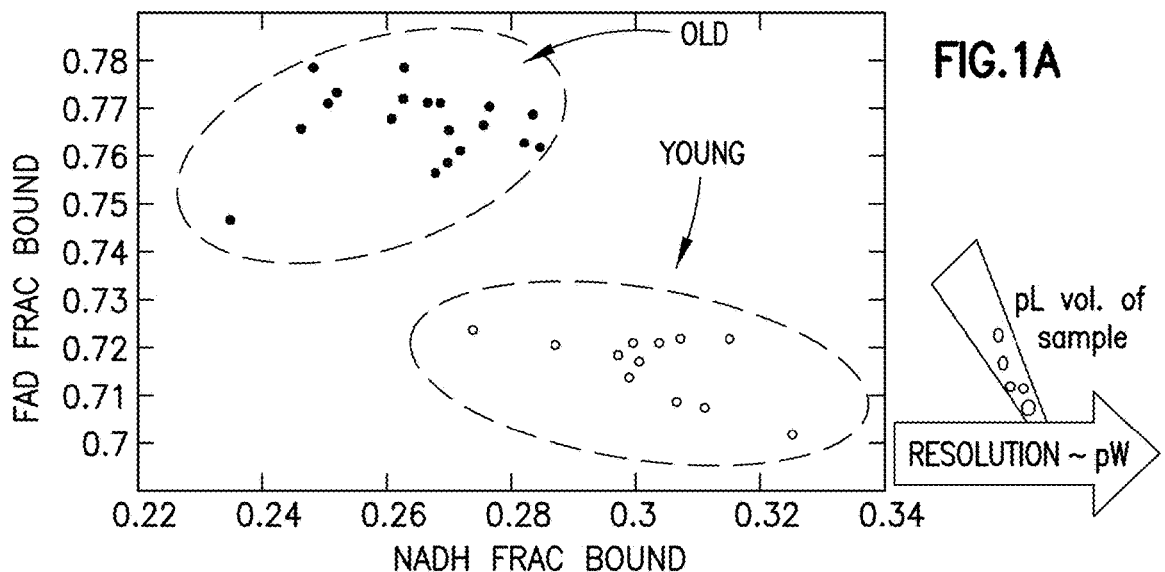
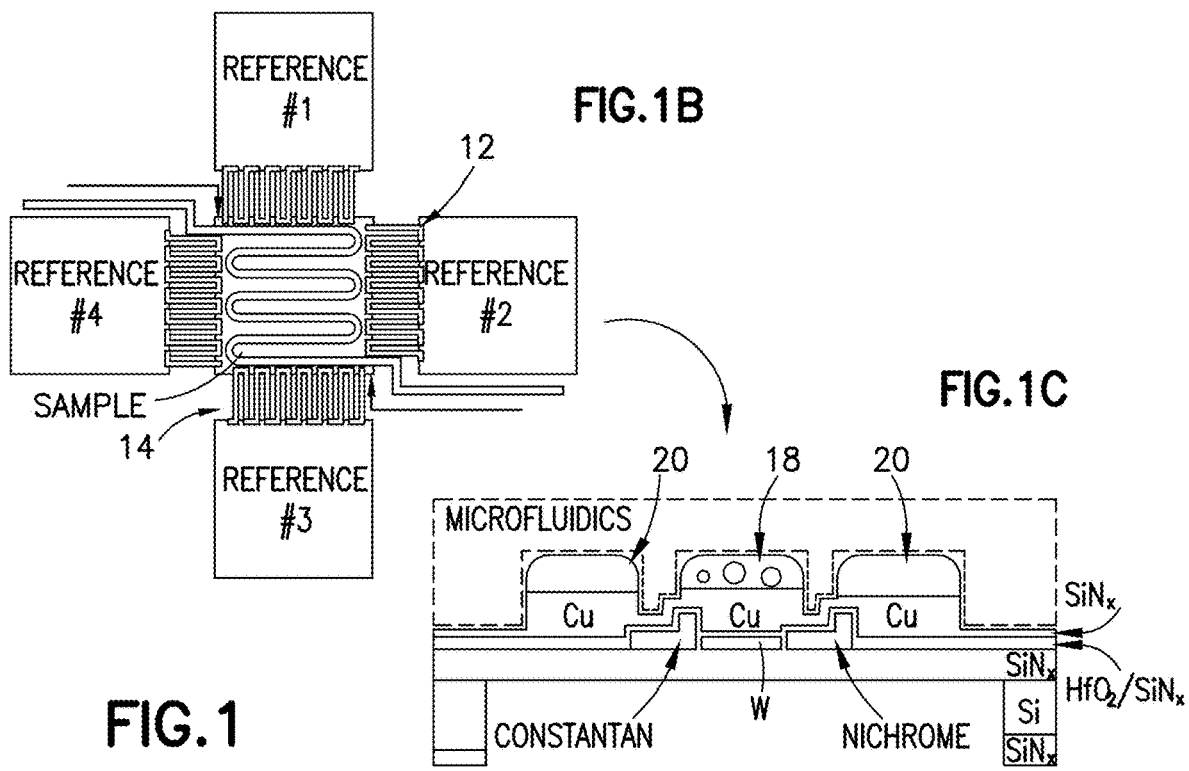

THERMOCOUPLE $\Delta V_0 = (S_A - S_B)(T_h - T_c)$

THERMOPILE $\Delta V_0 = n\Delta V_0$ $S_A$ & $S_B$: THE SEEBECK COEFFICIENTS OF CONDUCTOR A AND B, RESPECTIVELY
$T_h$ & $T_c$: THE TEMPERATURE AT EACH JUNCTION, $T_h > T_c$
n: THE NUMBER OF THERMOCOUPLES CONNECTED IN SERIES THERMOELECTRIC EFFECT (SEEBECK EFFECT)
THE CONVERSION OF HEAT DIRECTLY INTO ELECTRICITY

RELATIVE NOISE EQUIVALENT POWER (NEP) OF MATERIALS

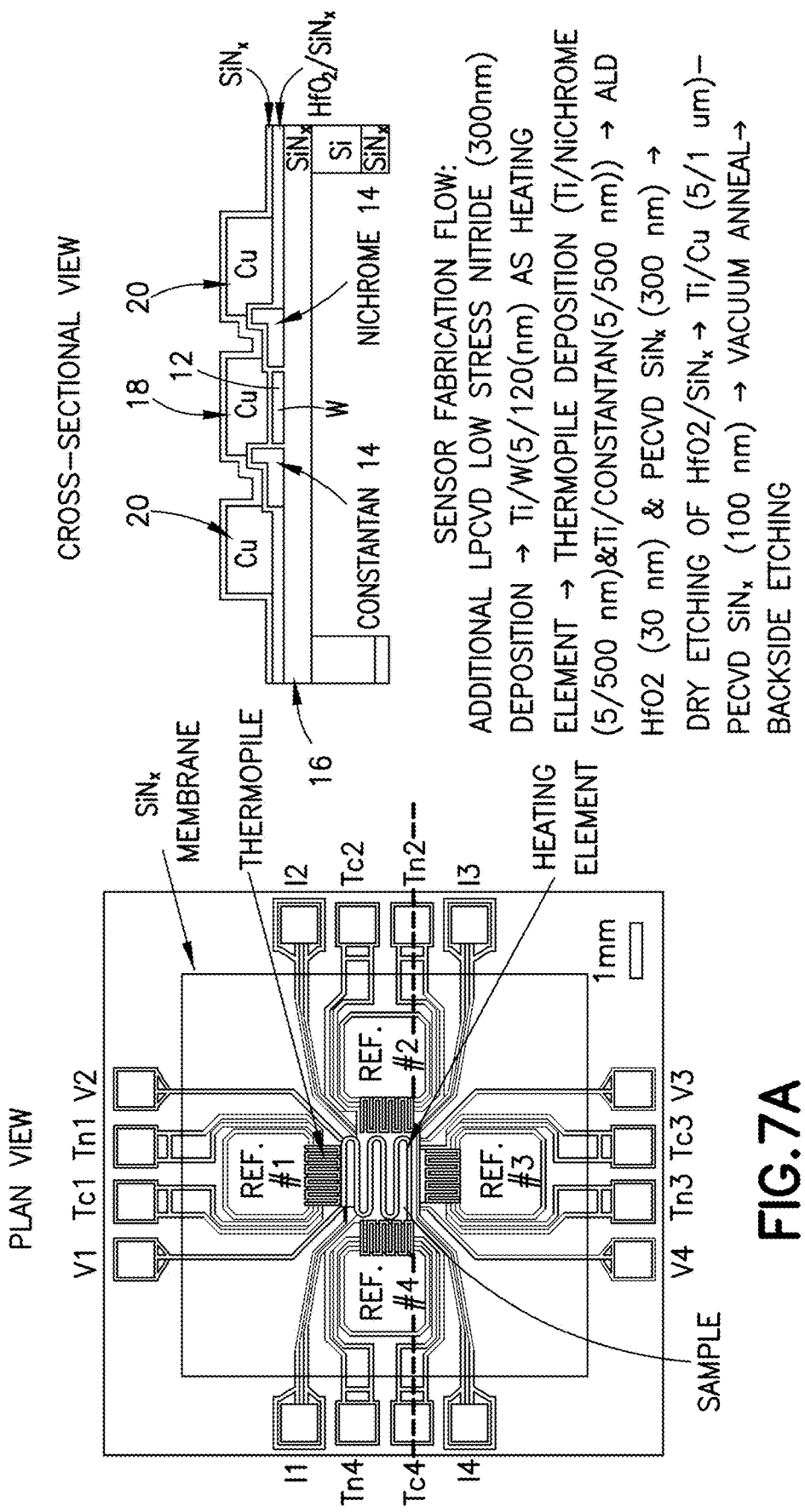

LPCVD SILICON NITRIDE (CVD-6 FURNACE IN CNS)

ONTO 300nm SUPER LOW STRESS LPCVD SILICON NITRIDE (FILM STRESS <100 ± 50Mpa)
-STANDARD RECIPE FOR LOW STRESS SiNx PROCESS (STRESS: 228 ± 26 MPa TENSILE)
THICKNESS: 300 nm (GROWTH RATE 5.4 nm/min)

| TEMPERATURE[a] | DCS FLOW | NH₃ FLOW | PRESSURE mTorr | # WAFERS[b] | WAFER SIZE (IN)[c] | DEPOSITION TIME (min) |
|---|---|---|---|---|---|---|
| 835, 835, 835 | 80 | 20 | 200 | 1-10 | 2-6 | VARIABLE |

TOTAL: 44 SENSORS IN 4 INCH WAFER

OVERALL ALIGNMENT

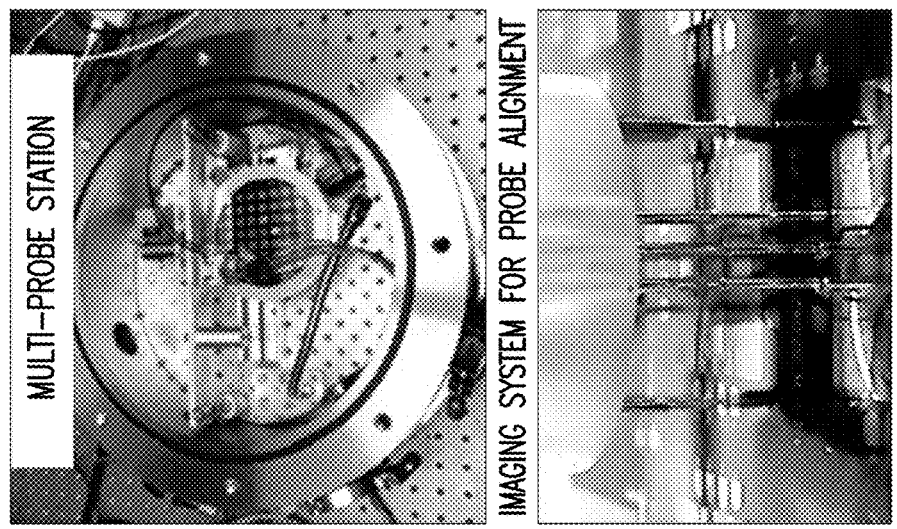
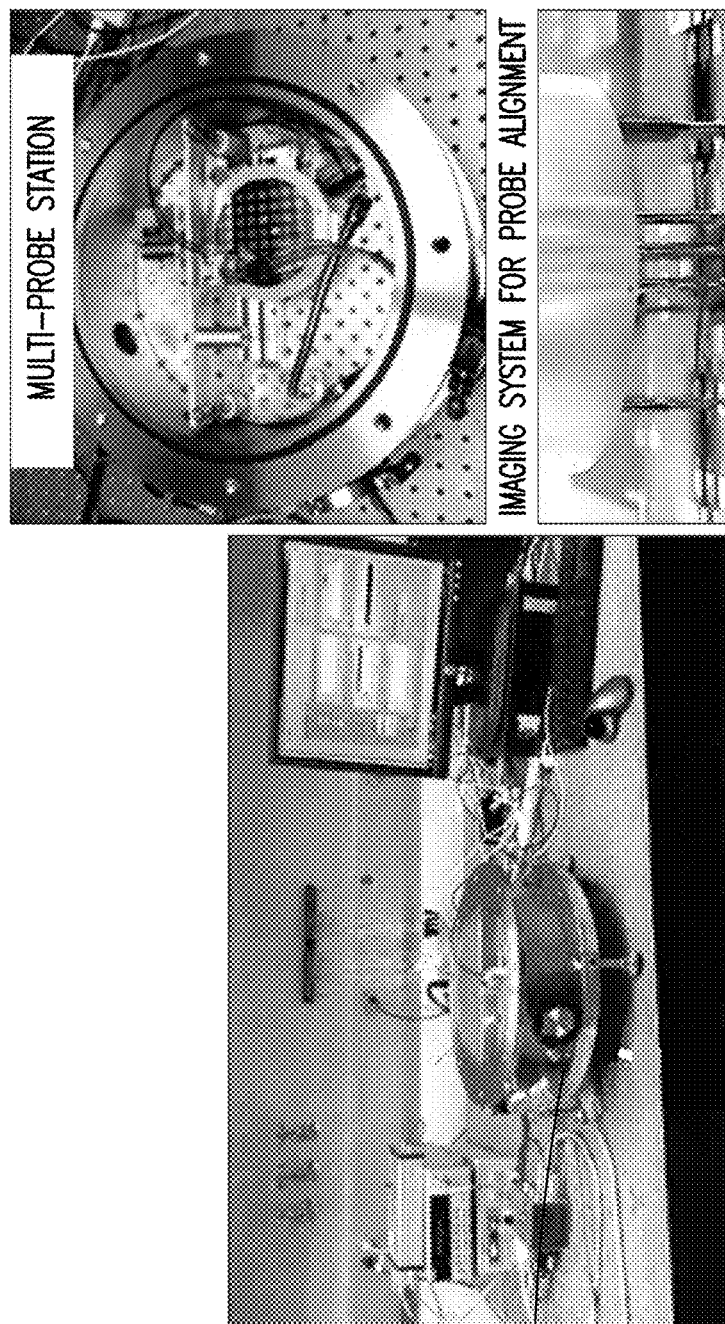
FIG. 17

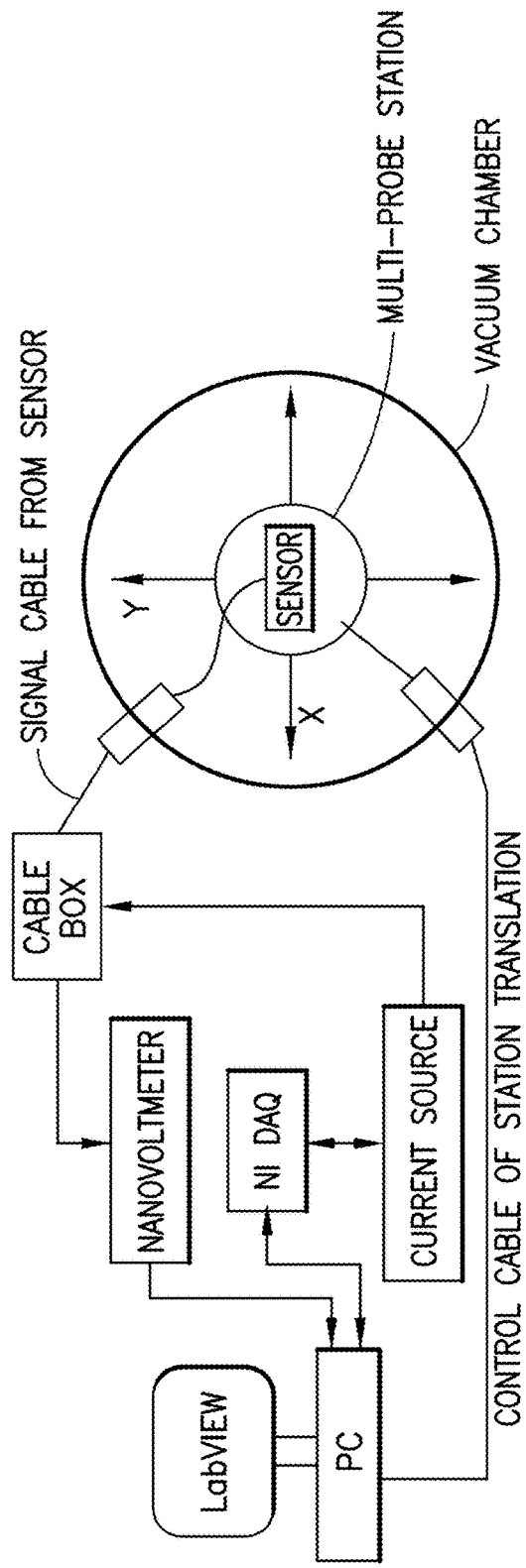
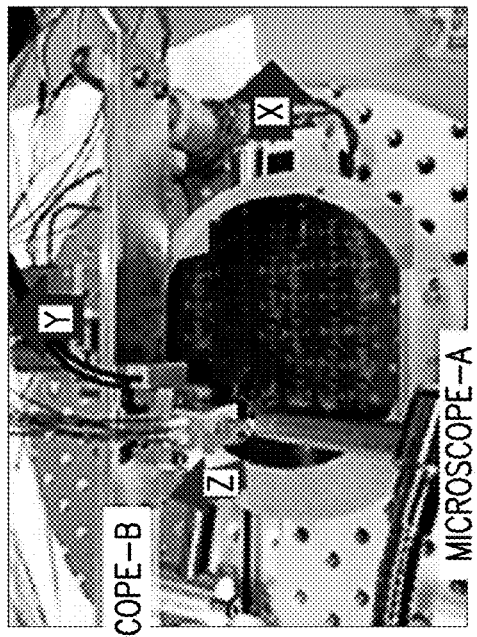
FIG. 18

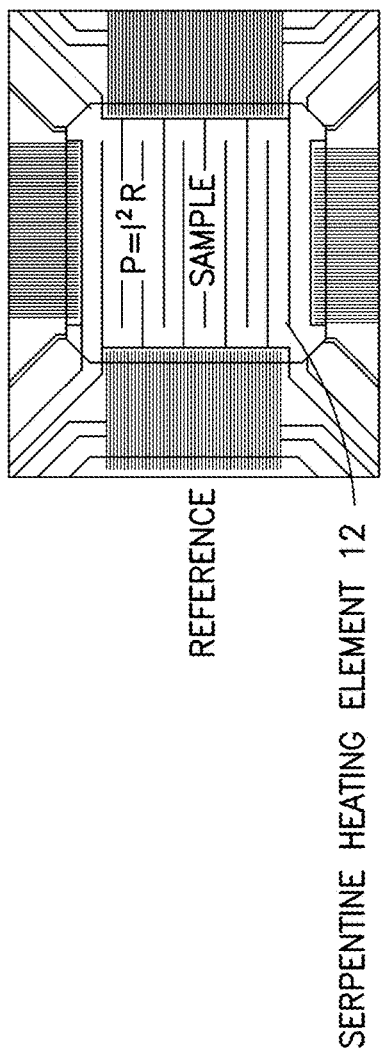
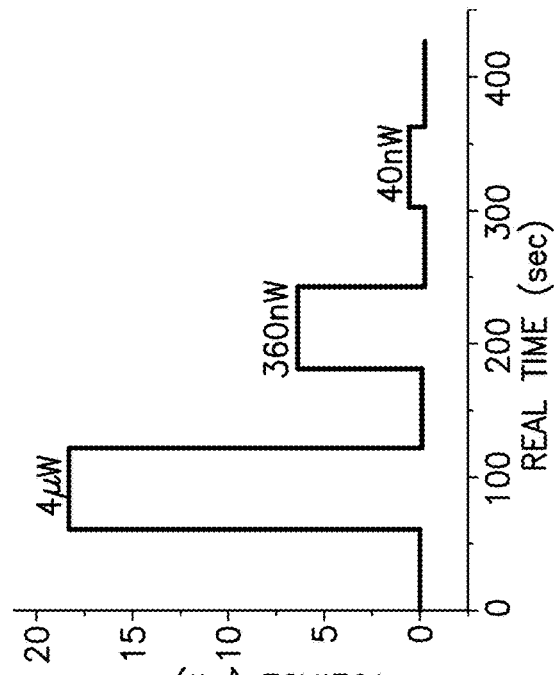
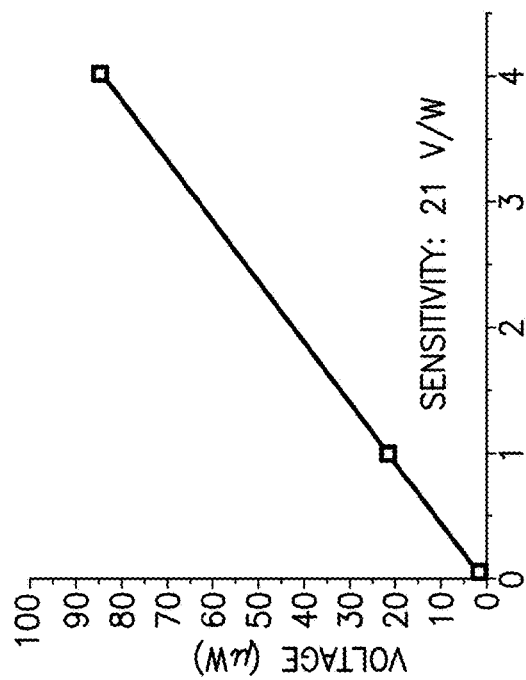
FIG.21A
FIG.21B
FIG.21C

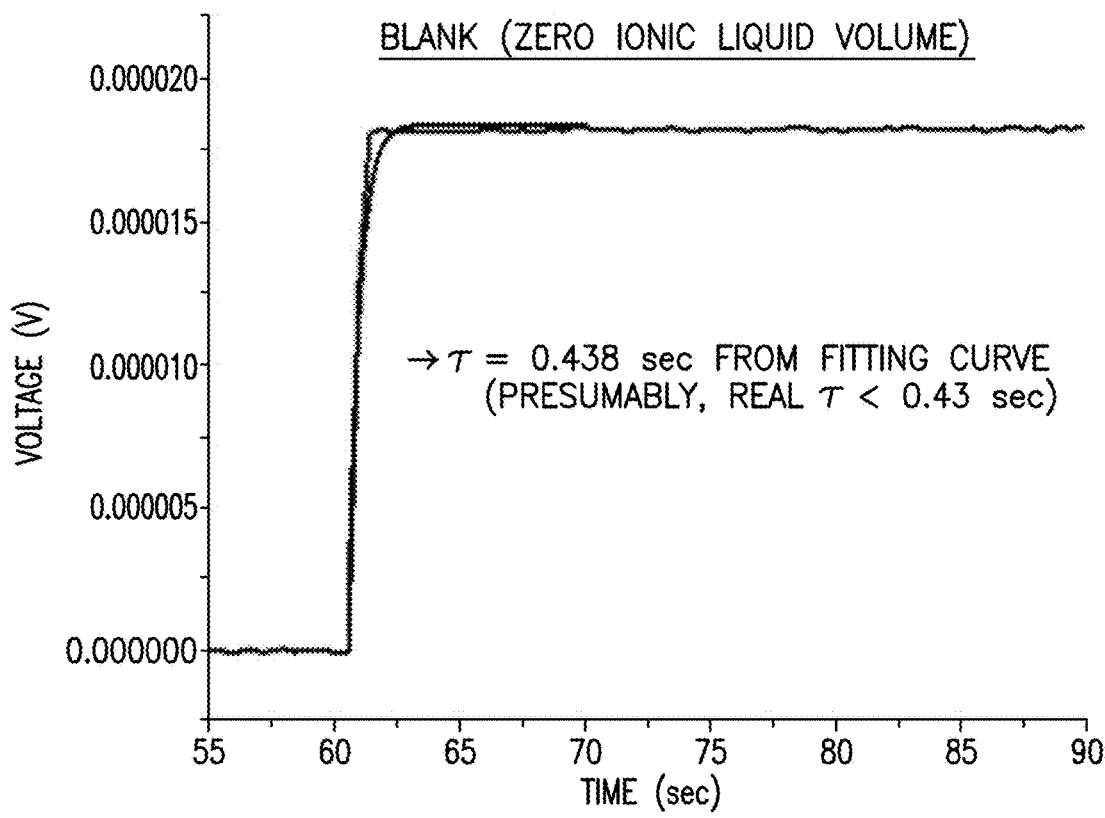
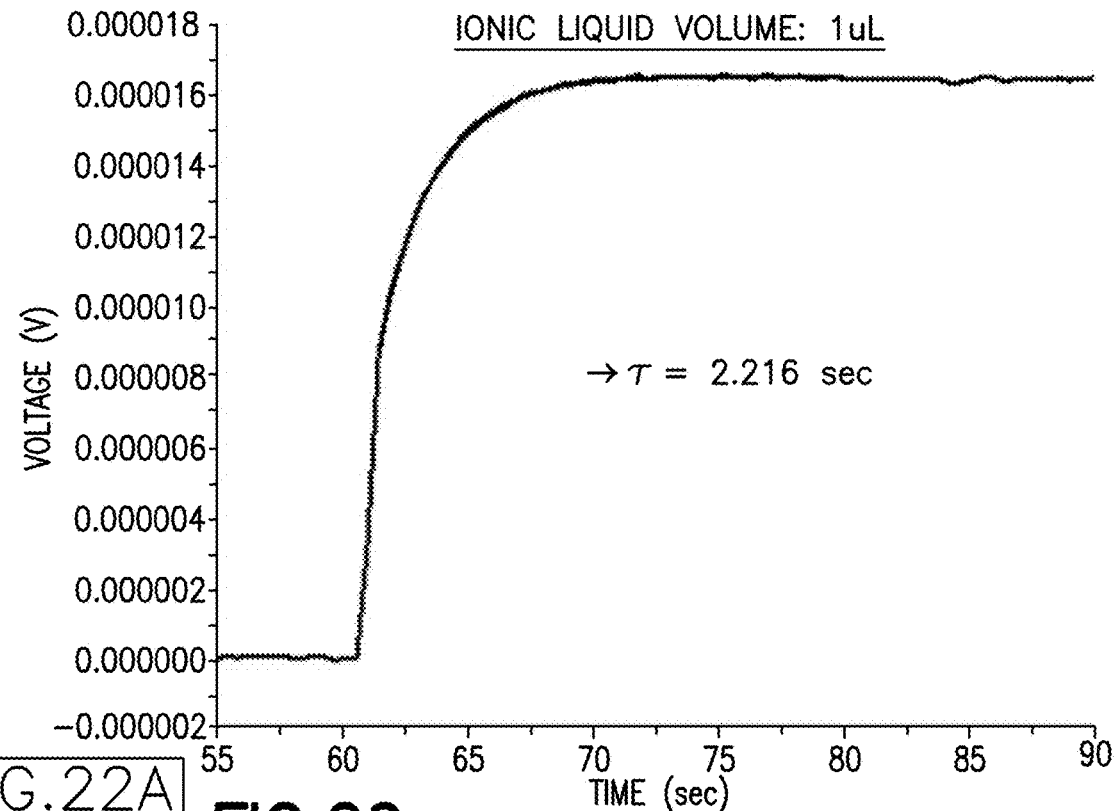
FIG.22A
FIG.22

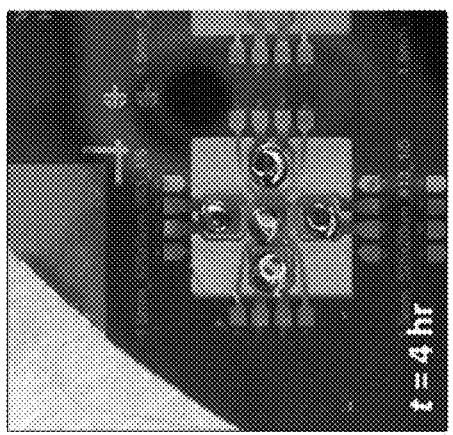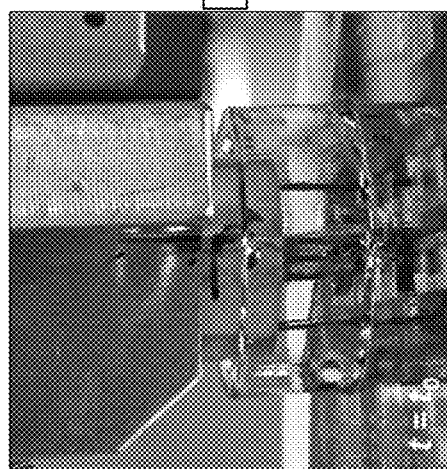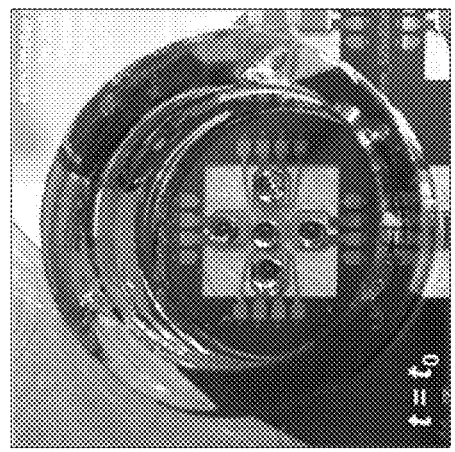
FIG. 24

HIGHLY SENSITIVE MICROCALORIMETERS FOR CELLULAR BIOENERGETICS

CROSS-REFERENCE TO RELATED APPLICATIONS

This application claims the benefit of U.S. Patent Application Ser. No. 62/420,995, filed Nov. 11, 2016, which is incorporated by reference herein in its entirety.

FIELD OF THE INVENTION

The present invention generally relates to a highly sensitive microcalorimeter, and more particularly, to such a microcalorimeter that possesses the sensitivity necessary for measuring cellular bioenergetics.

BACKGROUND

The study and qualitative measurement of cellular metabolic power has been a focus of researchers for many years. For example, it would be desirable to enable direct measurement of energy production and consumption changes in eggs and embryos during early development. Further, it would be beneficial to be able to study the potential tie between the rate and fidelity of early development and bioenergetics. It would also be highly beneficial to provide a device and method that is capable of being used with limited analytical volumes (i.e., small scale samples).

Microcalorimeters have great potential for use as biosensors. In particular, microcalorimeters offer real time measurement of small sample volumes (~nL), possess high throughput capability, allow for label-free sensing, and utilize simple sample preparation. However, their low sensitivity and difficulty in fluid handling have been critical challenges. For example, the average metabolic power of a single mammalian cell is on the order of about 60 pW, which requires sensitivity lacking in current microcalorimeters.

SUMMARY OF THE INVENTION

Embodiments of the present invention provide a microcalorimeter device having the sensitivity necessary for measuring cellular bioenergetics and systems that are limited in analytic volume. In particular, the microcalorimeter device is designed to provide sub-nanoWatt resolution and even tens of pico-Watt resolution, thus enabling resolution of the metabolic rate of a single cell. The present microcalorimeter design makes this possible by optimizing maximum sensitivity, sensor geometry and materials based on the temperature field that develops around a typical sample, and by further taking into account corresponding noise equivalent power and minimum detectable power.

According to one aspect, the present invention provides a device for quantitatively measuring the metabolic rate of a single cell comprising a highly sensitive thermopile-based microcalorimetric sensor, wherein the thermopile-based microcalorimetric sensor provides sub nano-Watt resolution.

Embodiments according to this aspect can include one or more of the following features. The thermopile-based microcalorimetric sensor includes a plurality of individual sensor elements, and each individual sensor element comprises a membrane and a combination of at least one heating element and at least one thermopile disposed on the same membrane. The thermopile is fabricated of a material is selected from a combination of Constantan and Nichrome or a combination of Constantan and Chromel®, where Chromel® is approximately 90% nickel and approximately 10% chromium by weight. Each individual sensor element includes one centrally positioned sample loading area with a heating element disposed therein, and four separate reference loading areas disposed surrounding the sample loading area, and the sample loading area and reference loading areas are disposed on the same membrane. Each individual sensor element includes a single sample loading area and a single reference loading area, the sample loading area and the reference loading area are each provided with heating elements, and the sample loading area and reference loading area are disposed on the same membrane. Each individual sensor element includes one centrally positioned reference loading area with four separate sample loading areas disposed surrounding the reference loading area, and the sample loading areas and reference loading area are disposed on the same membrane. The heating elements are configured to enable scanning measurements. The sensor is calibrated by providing a direct link between an input power and a thermopile output. The heating element is serpentine shaped and is disposed within the sample loading area. The thermopile-based microcalorimetric sensor provides tens of pico-Watt resolution.

According to another aspect, the present invention provides a sensor element having sub nano-Watt resolution comprising a membrane and a combination of at least one heating element, at least one sample loading area, at least one reference loading area, and at least one thermopile disposed on the same membrane.

Embodiments according to this aspect can include one or more of the following features. The sensor element comprises a single sample loading area with a heating element disposed therein and a single reference loading area with a heating element disposed therein, and the sample loading area and reference loading area are disposed on the same membrane. The sensor element comprises a centrally positioned single sample loading area with a heating element disposed therein and a plurality of reference loading areas surrounding the sample loading area, and the sample loading area and reference loading areas are disposed on the same membrane. The sensor element comprises four reference loading areas surrounding a single sample loading area. The sensor element comprises a centrally positioned single reference loading area with a plurality of (e.g., four) separate sample loading areas disposed surrounding the reference loading area, and the sample loading areas and reference loading area are disposed on the same membrane. The at least one heating element is serpentine shaped. The thermopile is fabricated of a material is selected from a combination of Constantan and Nichrome or a combination of Constantan and Chromel®. The heating elements are configured to enable scanning measurements.

Other systems, methods and features of the present invention will be or become apparent to one having ordinary skill in the art upon examining the following drawings and detailed description. It is intended that all such additional systems, methods, and features be included in this description, be within the scope of the present invention and protected by the accompanying claims.

BRIEF DESCRIPTION OF DRAWINGS

The accompanying drawings are included to provide a further understanding of the invention, and are incorporated in and constitute a part of this specification. The drawings illustrate embodiments of the invention and, together with the description, serve to explain the principals of the invention. The components in the drawings are not necessarily to scale, emphasis instead being placed upon clearly illustrating the principles of the present invention. In the drawings, each like component is referenced by a like numeral. For purposes of clarity, every component may not be labeled in every drawing. In the drawings:

FIGS. 1A-C illustrate a schematic in which in vivo fluorescence lifetime imaging microscopy (FLIM) can be used in combination with a thermopile based pW-resolution microcalorimeter sensor to quantitatively measure energy production and consumption in a single cell in real time, according to an embodiment of the present invention.

FIGS. 7A-B schematically illustrate sensor fabrication flow according to an embodiment of the present invention, with a top view of the resulting sensor (FIG. 7A) and a side cross-sectional scheme of the resulting sensor (FIG. 7B).

FIG. 17 illustrates a data acquisition system, according to an embodiment of the present invention.

FIG. 18 illustrates a schematic of a data acquisition system, according to an embodiment of the present invention.

FIGS. 21A-C illustrate sensitivity (FIG. 21B—output voltage per input power) and response time (FIG. 21C—basically the blank state) of a microcalorimetric sensor, according to an embodiment of the present invention.

FIG. 24 illustrate placement of fully swelled hydrogel cylinders surrounding a sensor having aqueous droplets covered by oil droplets deposited onto the sample and reference loading areas, and the resulting droplets after 4 hours, according to an embodiment of the present invention.

DETAILED DESCRIPTION OF THE INVENTION

Figures 2, 2A, 2B:
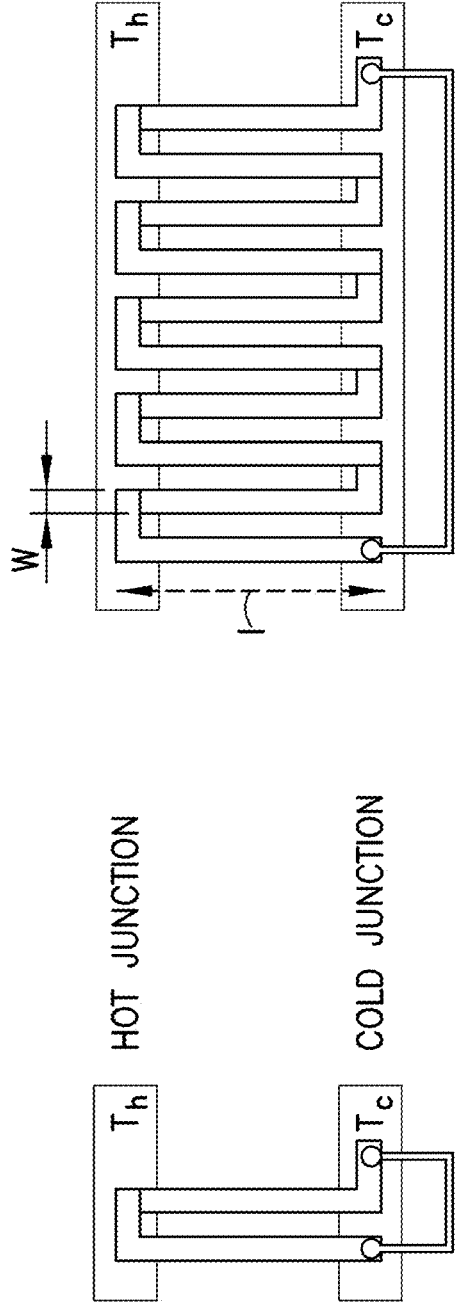
FIGS. 2A-B schematically illustrate thermoelectric effect of a thermopile arrangement, according to an embodiment of the present invention.

The present invention provides an improved device and method for quantitatively measuring cellular bioenergetics. In particular, the present invention provides a highly sensitive thermopile-based microcalorimetric sensor with sub-nWatt resolution and even tens of pico-Watt resolution. Such sensors are capable of resolving systems that are limited in analytic volume and even resolving the metabolic rate of a single cell.

According to embodiments of the invention, individual microcalorimeter sensors 10 include a combination of heating elements 12 and thermopiles 14 disposed on a membrane 16. The membrane 16 may be a thin silicon nitride membrane or the like. A sample loading area 18, together with one or more reference loading area 20, are provided on the membrane 16. In some embodiments, a reference loading area 20 together with one or more sample loading areas 20, are provided on the membrane 16. In some embodiments, a single sample loading area 18 is disposed in a central location (e.g., as depicted in FIGS. 1B-C, 5A, 6A, 7A-B) surrounded by a plurality of reference loading areas 20 (in particular, four reference loading areas 20 in the depicted embodiments). Positioned directly beneath the sample loading area 18 is the built-in heating element 12. In another embodiment, a single sample loading area 18 is provided in connection with a single reference loading area 20, each with a built-in heating element 12 positioned beneath each loading area 18, 20. As depicted, the thermopiles 14 are disposed between the sample loading area 18 and the one or more reference loading areas 20.

The present sensor structure allows for direct differential measurements between a sample and one or more references disposed on respective sample and reference loading areas 18, 20. In order to maximize sensitivity, the sensor geometry and materials are optimized based on the temperature field that develops around a typical sample, as well as on calculations of the corresponding noise equivalent power (NEP) and minimum detectable power ($P_{min}$).

To optimize the design of the thermopiles 14, the temperature field was derived for a typical sample, and both the noise equivalent power (NEP) and minimum detectable power ($P_{min}$) were calculated for different materials systems and thermopile geometries. According to the present invention, both the sample(s) and the reference(s) are deposited on the same membrane, allowing for differential measurements of the sample(s) and reference(s) under identical conditions.

Figure 5B:
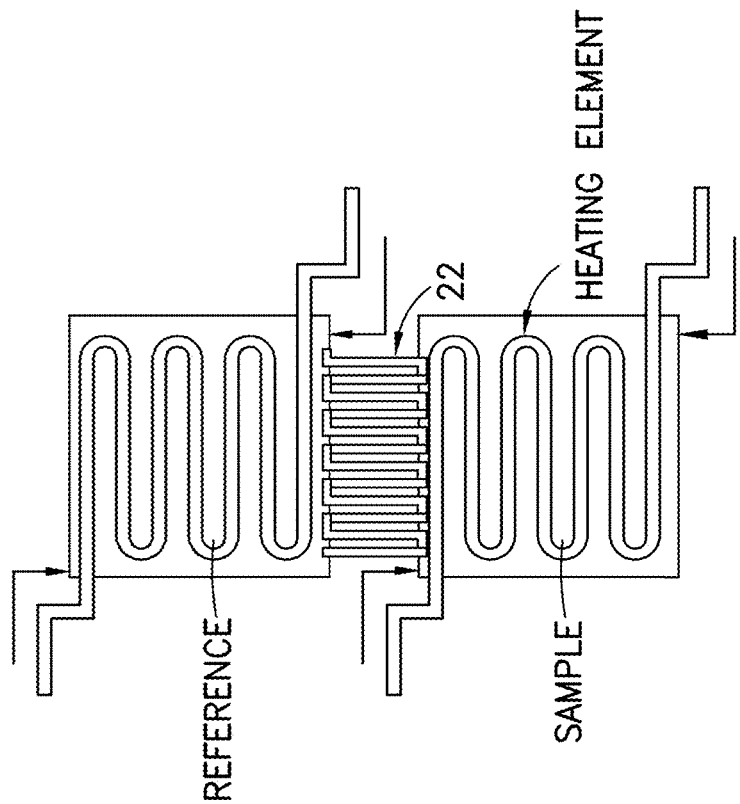
FIGS. 5A-B schematically illustrates a sensor design with four separate reference loading areas surrounding a sample loading area (FIG. 5A), and a sensor design with one sample loading area and one reference loading area (FIG. 5B), according to embodiments of the present invention.
Figures 6A, 6B:
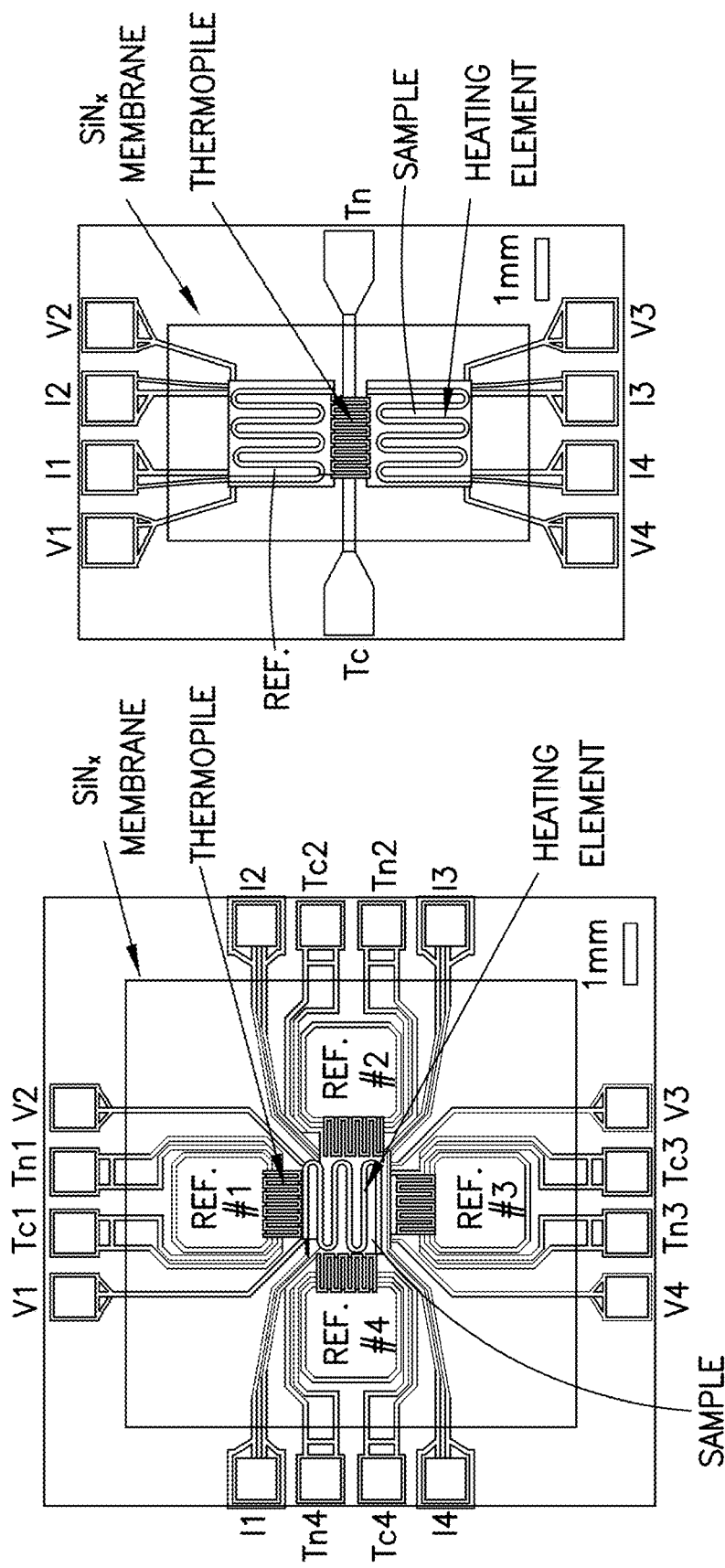
FIGS. 6A-B schematically illustrates another view of the sensor designs of FIGS. 5A-B.

According to some embodiments, for example as depicted in FIGS. 5B and 6B, a single sample loading area 18 and a single reference loading area 20 are provided, which is mainly utilized for scanning measurements. For example, such a sensor design may be configured to measure a cell's response or particular behavior while heating or cooling the environment. Such a configuration may also be useful in less sensitive systems.

According to other embodiments, a plurality of reference loading areas 20, such as four (e.g., see FIGS. 5A and 6A) or other numbers not depicted (e.g., two, three, etc.), makes it possible to correct for any temperature gradients in the sensor as a result of ambient factors. While such temperature gradient correction is not typically important in most applications, it becomes critical at high sensitivity levels of the present invention. The sensor configuration according to FIG. 5A (or other embodiments using multiple references) resolves the heat production and consumption of cells at a certain temperature under ambient or controlled environment conditions.

When the sensor is used as a differential measurement system, the heating element 12 is mainly for calibration of the fabricated sensor. Of course, it can also be used for heating up the sample area, if necessary. It is further noted that configurations are also possible in which a reference loading area 20 is disposed in a middle location connecting with a plurality (3.g., two, three, four, etc.) sample loading areas 18. Such embodiments may be utilized, for example, when differential measurement is not required.

In particular, material sensitivity and geometry design of the thermopiles 14 was studied in light of minimized NEP. Using the relationship set forth below, as shown by Equation 1, appropriate materials and design variables can then be selected to obtain a desired NEP.

$$NEP = \frac{kA}{nS_{AB}l}\sqrt{4k_BTR}\ [W/\sqrt{Hz}] \qquad \text{Eq. 1}$$

$\begin{bmatrix} k_B\text{: Boltzmann's constant} 1.38\times 10^{\wedge}\cdot 23 \text{ J/K} \\ T\text{: temperature [K]} \\ n\text{: the number of thermocouples connected in series} \\ R\text{: thermophile electrical resistance} \\ k\text{: thermal conductivity} \\ l\text{: thermophile length} \\ A\text{: cross-sectional area of thermophile} \\ P\text{: resistivity of thermopile material }[\Omega\ m] \\ S_{AB} = |S_A - S_B|, \text{ relative Seebeck coefficient} \end{bmatrix}$ For example, the material system selections that can be made to minimize NEP include increasing SAB (Seebeck coefficient), and decreasing k (thermoconductivity). The thermopile design variables that can minimized NEP include increasing n (number of thermocouples connected in series) and optimizing geometry (hw/l). For example, FIG. 2A depicts a thermocouple, and FIG. 2B illustrates an exemplary thermopile scheme formed from a plurality of thermocouples connected in series, and the resulting thermoelectric effect.

Figure 3:
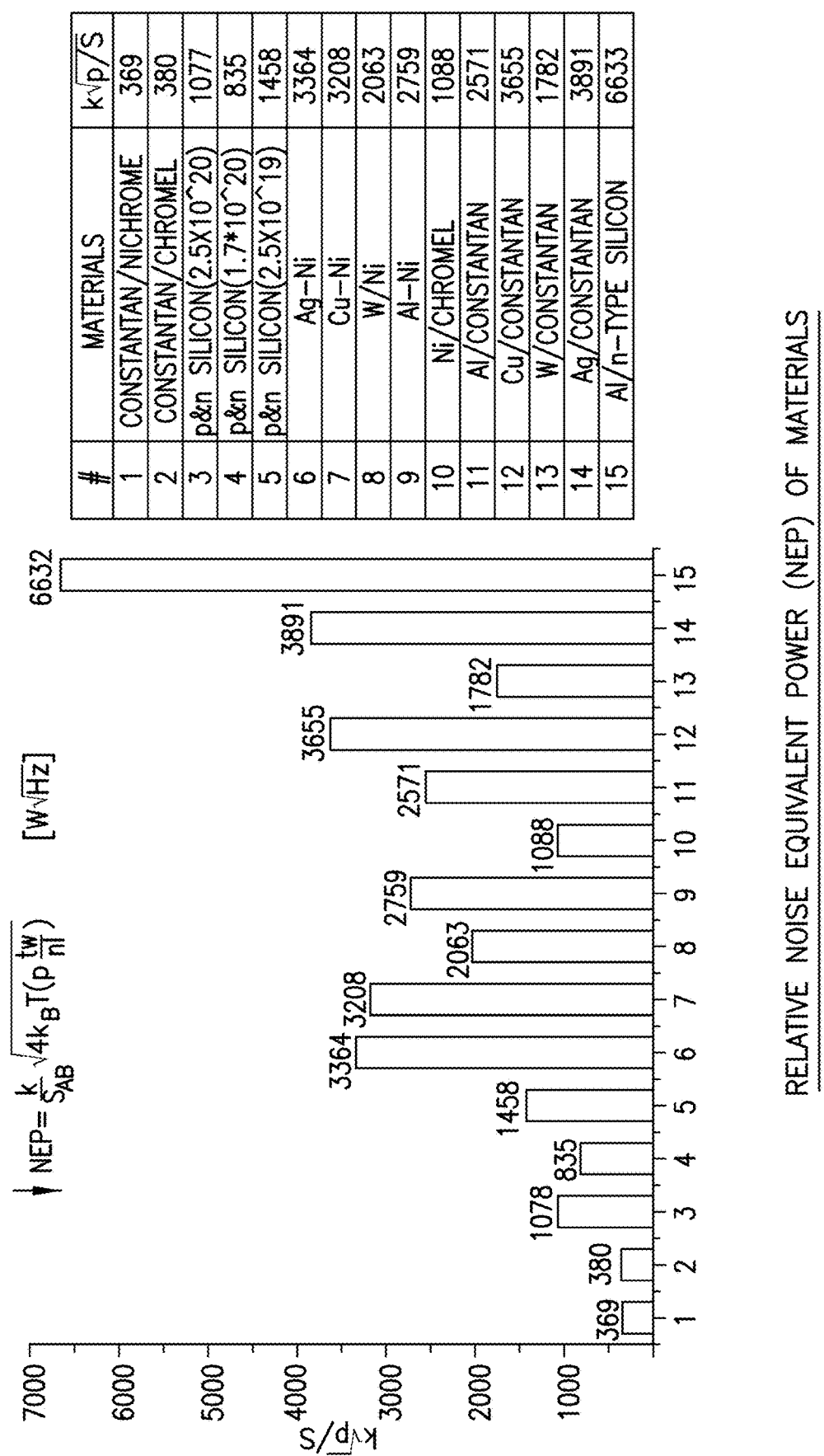
FIG. 3 demonstrates the impact of material selection on relative noise equivalent power (NEP) for fifteen sample materials, according to an embodiment of the present invention.

According to embodiments of the present invention, various thermopile materials were combined and tested to determine possible materials to utilize in order to obtain minimum NEP. As shown in FIG. 3, materials #1-4 (Constantan/Nichrome, Constantan/Chromel®, p&n silicon with doping concentration $2.5\times10^{20}$, p&n silicon with doping concentration $1.7\times10^{20}$, and p&n silicon with doping concentration $3.3\times10^{19}$) contributed to providing much lower NEP values, with Constantan/Nichrome providing the lowest NEP.

Next, material selection in combination with thermopile length was analyzed. It was determined that thermopiles could provide increased sensitivity (decreased minimum detectable power) with increased thickness and decreased width. Thermopiles fabricated of (1) P-polysilicon/aluminum, (2) N-polysilicon/aluminum, (3) Constantan/Chromel®, (4) Constantan/Nichrome, and (5) P-polysilicon/N-polysilicon) were formed, having a width of 5 μm (this value was limited by photolithography resolution) and a thickness of 500 nm. This thickness value was selected for ease in delamination, and to enable triggering the instability of the freestanding membrane. In particular, if the film is thicker than about 500 nm (so 1 um thickness at the junction of Constantan and Nichrome), the film can easily delaminate, causing the membrane to fracture, or to buckle.

The thermopile length was then varied to determine resulting minimum detectable power ($P_{min}$). Equation 2 is derived by considering conductive heat loss through a thermopile and air; as well as heat transfer of the thermopile.

$$P_{min} = 16\pi \frac{\lambda_s}{S_{AB}} \sqrt{\rho_A + \rho_B} \sqrt{k_B TB} \sqrt{\frac{lw}{h_{TP}}} \frac{1}{1-\exp\left(-\sqrt{\frac{\lambda_g}{kh_{TP}L_0}}l\right)} \qquad \text{Eq. 2}$$

Figure 4:
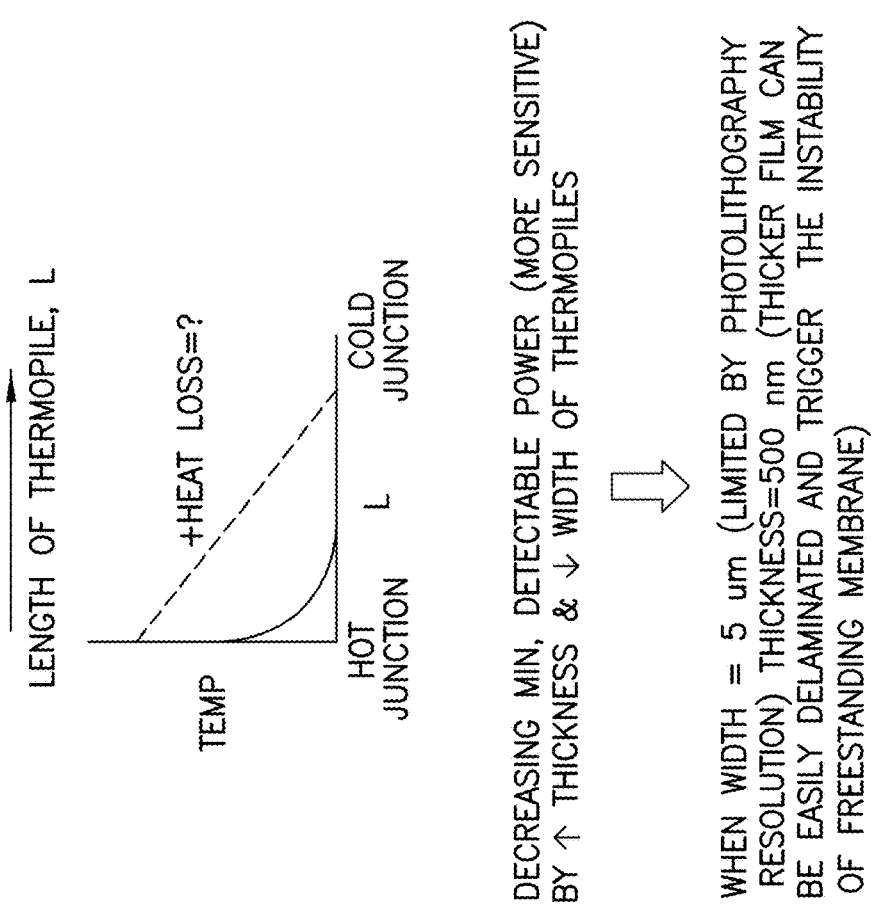
FIG. 4 demonstrates the impact of material selection and thermopile geometry on $P_{min}$.

$\begin{bmatrix} \lambda_g\text{: thermal conductivity of the air} (0.026\ W/Km) \\ S_{AB}\text{: Seebeck coefficient} \\ \rho_A \text{ and } \rho_B\text{: resistivity of thermopile} \\ B\text{: Band width (1 Hz)} \\ l\text{: length of thermopile} \\ w\text{: width of thermopile}(5\ \mu m) \\ h_{TP}\text{: thickness of thermopile}(500\ nm) \\ L_0\text{: } z = L_0 \text{ when } T = T_A\ (0.5\ mm) \end{bmatrix}$ As illustrated in FIG. 4, both Constantan/Nichrome (lowest curve) and Constantan/Chromel® (second to lowest curve) alloy systems provide excellent sensitivity and are capable of sensing power levels on the order of 100 pW over a broad range of thermopile lengths. This level of resolution is sufficient to resolve the metabolic rate of a single mammalian cell. Further, Constantan/Nichrome was demonstrated to provide the lowest $P_{min}$ at a thermopile length of 525 μm. P-polysilicon/N-polysilicon was the next lowest curve (third lowest) and, is capable of sensing below nW power levels.

The optimum thermopile length follows from a trade-off between maximizing the temperature differential between the sample and the reference and minimizing the resistance of the thermopile. The optimum width can vary, and was generally selected based upon manufacturing considerations. However, in general, narrower widths are good for reducing $P_{min}$, but 5 mm is the narrowest (or smallest feature size) width that can be reached by using the conventional photolithographic techniques. If desired, more advanced techniques could be used to achieve much smaller widths.

Figure 5A:
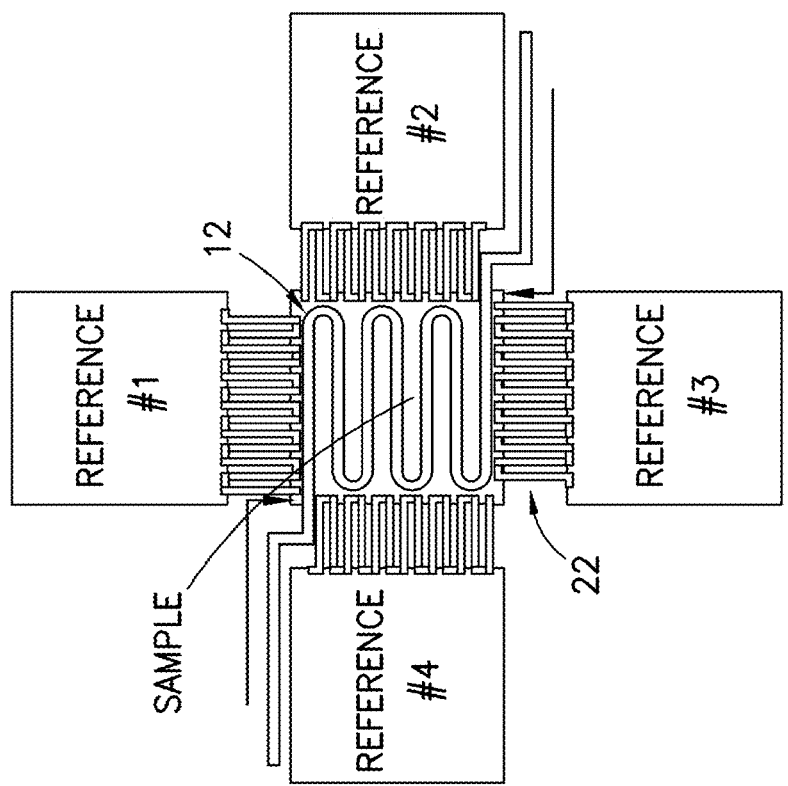

Looking to sensor layout and fabrication, two different designs were developed to optimize sensitivity: a design with four reference loading areas 20 for isothermal measurements, as depicted in FIGS. 5A and 6A, and a design with one reference loading area 20 for less sensitive isothermal measurements or scanning measurements, as depicted in FIGS. 5B and 6B. As shown, in the design of FIGS. 5A and 6A, one sample loading area 18 is disposed in the center with a heating element 12 positioned directly beneath the sample loading area 18, and four separate reference loading areas 20 disposed about the center sample loading area 18. As shown in the design of FIGS. 5B and 6B, the sensor includes a single sample loading area 18 and a single reference loading area 20, where the sample loading area 18 and reference loading area 20 are each provided with a heating element 12 disposed beneath each area.

Fabrication of the present sensor devices involved several materials that are not commonly used in a clean-room environment, and thus, several new unit processes were developed. Further, in order to develop sensors according to the present invention, potential issues with deposition stresses in sputtered alloy thin films were addressed. Further, freestanding silicon nitride membranes capable of withstanding the stresses induced by the complex metal patterns required for the sensor were fabricated.

An overall embodiment of sensor fabrication flow includes the following steps, as illustrated in FIG. 7, low stress silicon nitride (300 nm) is first deposited onto a wafer (e.g., a SiN wafer), preferably using low pressure chemical vapor deposition (LPCVD) or the like to provide a thermal insulation layer. Heating elements 12 (e.g., Ti/W 5/120 nm) are then patterned on the wafer, particularly in a central location which will form the sample loading area 18. Next, the desired thermopiles 14 are deposited according to the selected geometry and material specifications (e.g., Ti/Nichrome 5/500 nm and Ti/Constantan 5/500 nm), particularly in locations connecting the sample loading area 18 to each reference loading area 20. $HfO_2$ (30 nm) deposition is then carried out (e.g., via atomic layer deposition (ALD)) followed by deposition of $SiN_x$ (300 nm), for example, using plasma-enhanced chemical vapor deposition (PECVD) (this bilayer of HfO2 30 nm and PECVD 300 nm serves as an electrical insulation layer). Subsequently, dry etching of HfO2/SiNx is carried out, followed by deposition of Ti/Cu (5/1 um) to form the sample loading area 18 and reference loading area(s) 20. Plasma-enhanced chemical vapor deposition (PECVD) of SiNx (~100 nm) is then carried out, followed by vacuum annealing and finally backside etching to produce the desired sensor structure.

Figure 8:
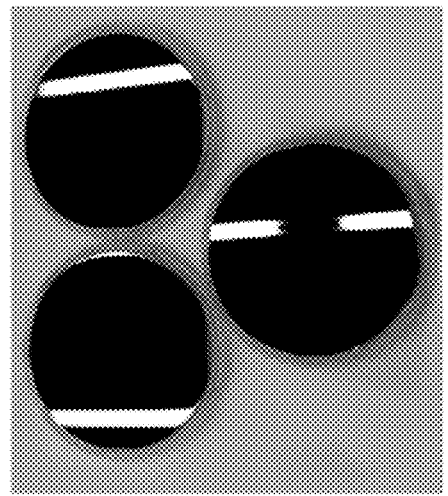
FIG. 8 illustrates an embodiment of LPCVD conditions for deposition of low stress silicon nitride film onto super low stress silicon nitride film deposited wafer, according to an embodiment of the present invention.

Specifically, with respect to deposition of silicon nitride onto a silicon nitride bilayer with a gradient of film stress (particularly, 300 nm super low stress LPCVD silicon nitride, stress <100±50 MPa, coated wafer), according to an embodiment illustrated in FIG. 8, silicon nitride was deposited in a 300 nm thick layer using LPCVD at a growth rate of 5.4 nm/min. A standard recipe for a low stress $SiN_x$ process (stress of 228±26 MPa tensile) is illustrated. This stress level and thickness of $SiN_x$ was tuned to enhance the freestanding membrane stability after backside etching.

Figure 9:
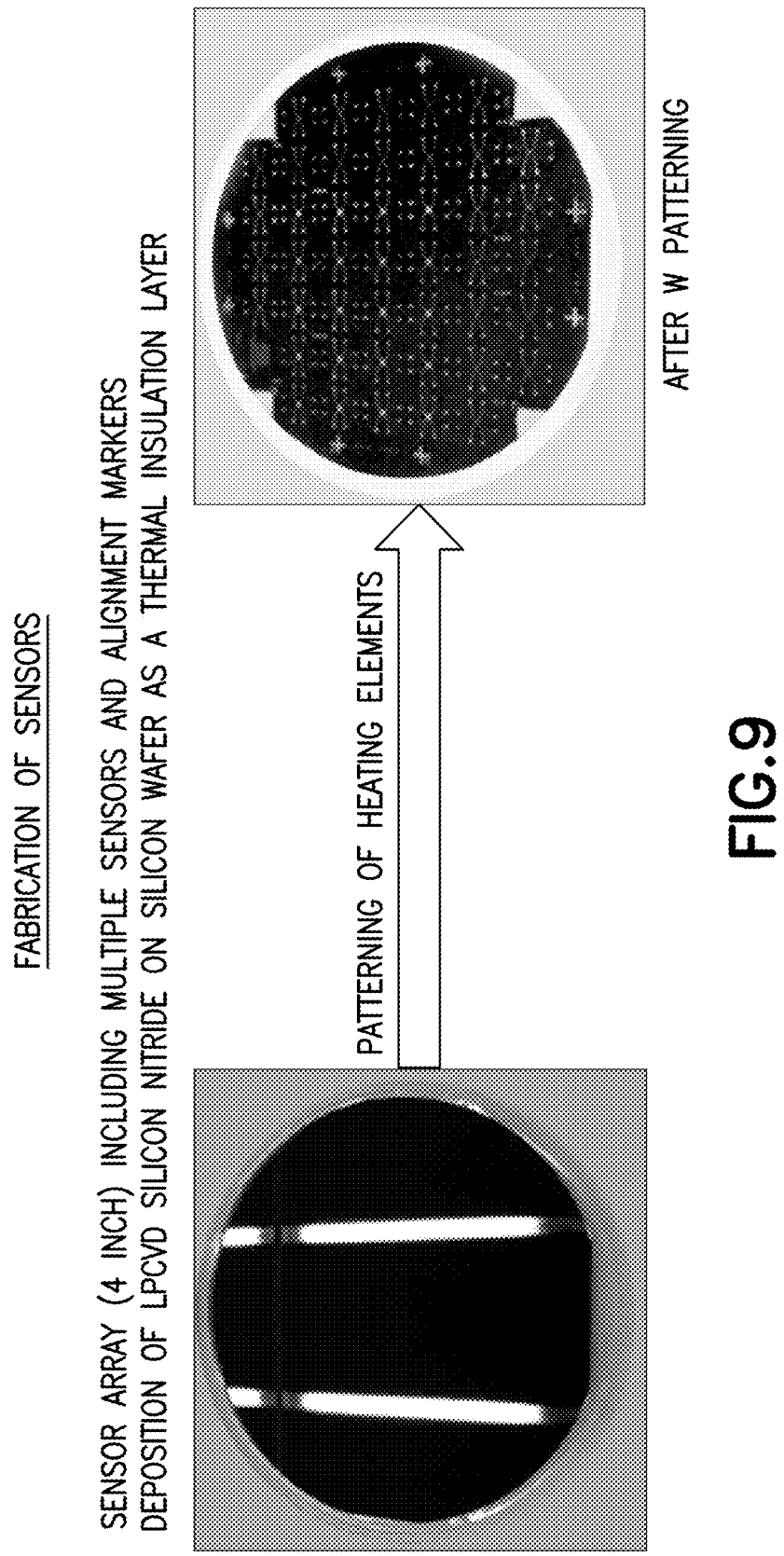
FIG. 9 illustrates deposition of silicon nitride onto a wafer, followed by patterning of heating elements, according to an embodiment of the present invention.

With respect to patterning of heating elements 12, according to an embodiment illustrated in FIG. 9, heating elements are patterned onto a 4 inch sensor array. The sensor array is fabricated so as to provide multiple sensors 10 thereon, and patterning is facilitated through the use of the alignment markers depicted in the left illustration. According to this embodiment, prior to patterning of the heating elements 12, silicon nitride is deposited onto the silicon wafer (e.g., as described in the previous step) to provide a thermal insulation layer.

Thermopiles 14 are next deposited onto the structure. In order to successfully deposit the thermopiles 14, thin film stress of thermopile materials (i.e., Constantan and Nichrome) were analyzed as a function of gas pressure during sputter deposition to prevent cracking and peeling of the films. Both Nichrome and Constantan films have fairly high tensile stress as compared to other metals. As such, low Ar pressure conditions are required during deposition to reduce film stress. These low Ar pressure conditions were analyzed to determine optimal conditions.

Figure 10:
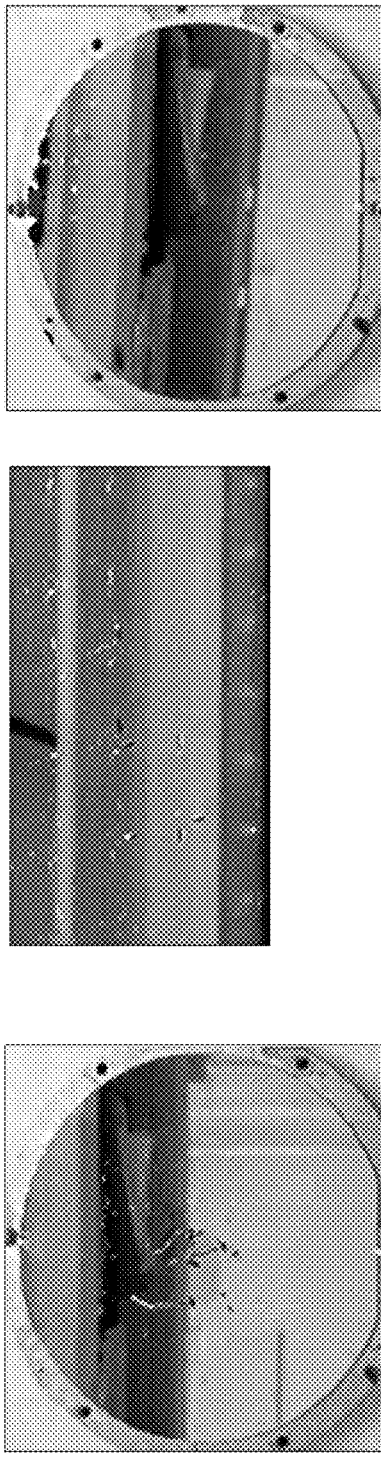
FIG. 10 shows film conditions and film stress measurements with varying Ar pressure and deposition time for Ti/Nichrome, according to embodiments of the present invention.
Figure 11A:
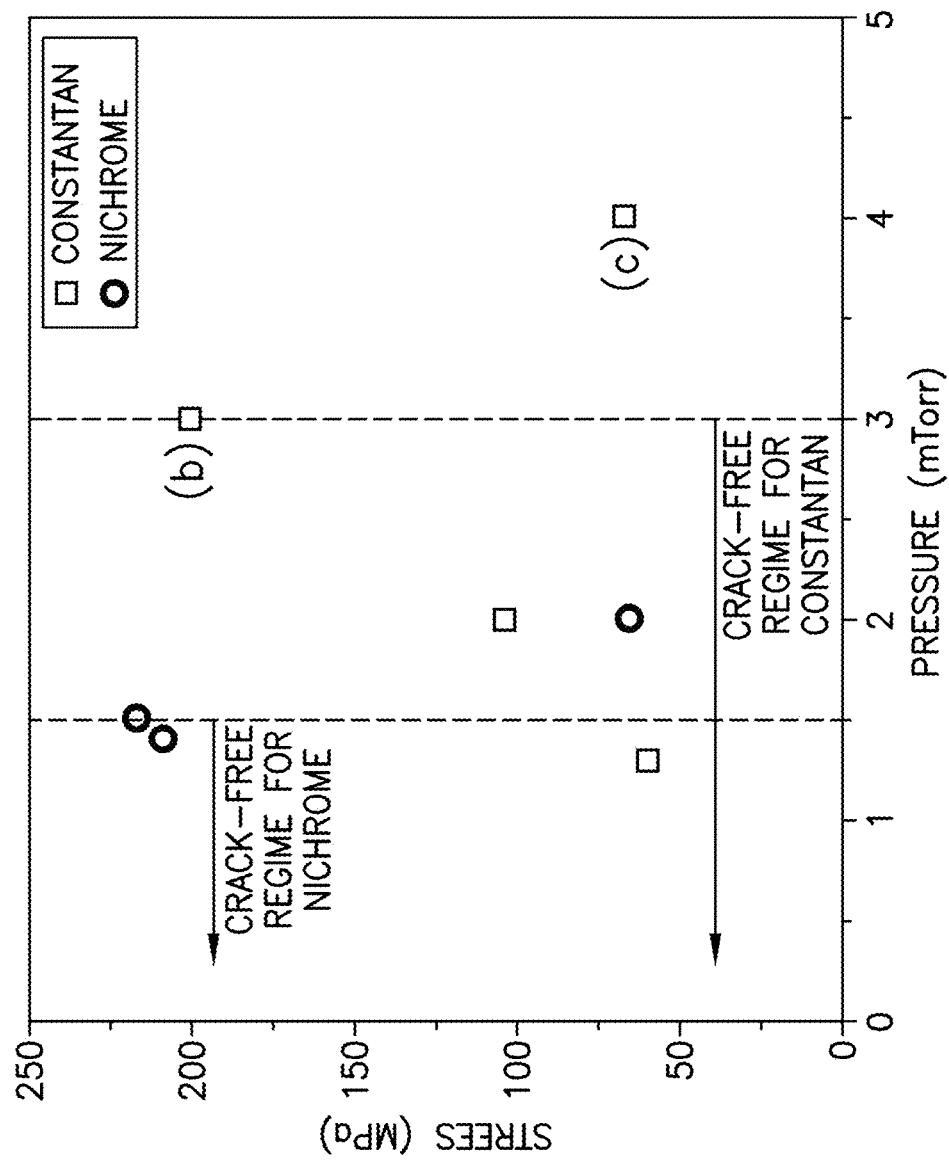
FIG. 11 illustrates (a) tensile stress dependence as a function of argon pressure by magnetron sputtering of Constantan/Nichrome, and the resulting films of Constantan sputtered film displaying (b) no cracks in Constantan at 3 mTorr, (c) a lot of cracks in Constantan at 4 mTorr, and (d) Nichrome/Constantan thermopile patterns by crack free sputtering conditions, according to embodiments of the present invention.
Figure 11D:
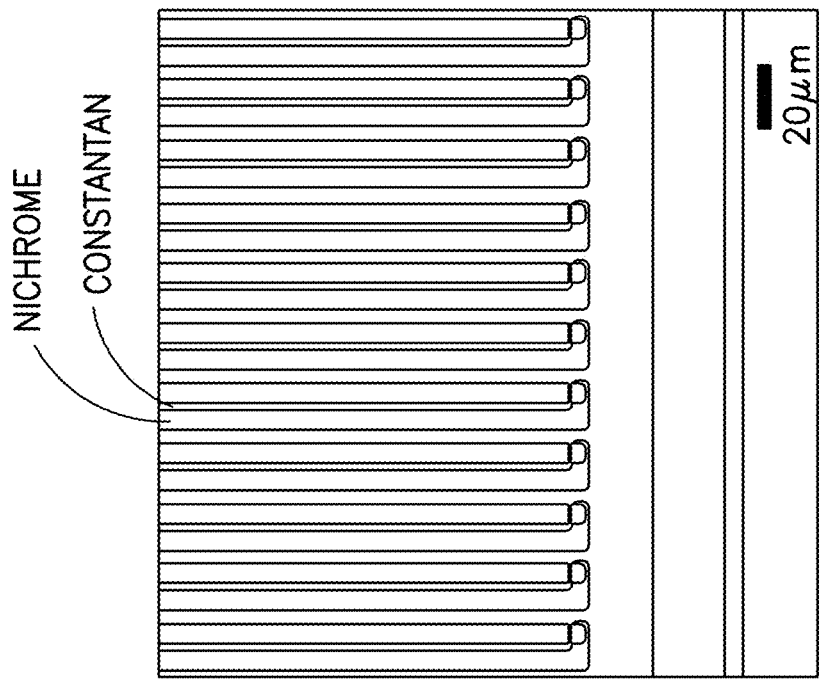
Figure 11B:
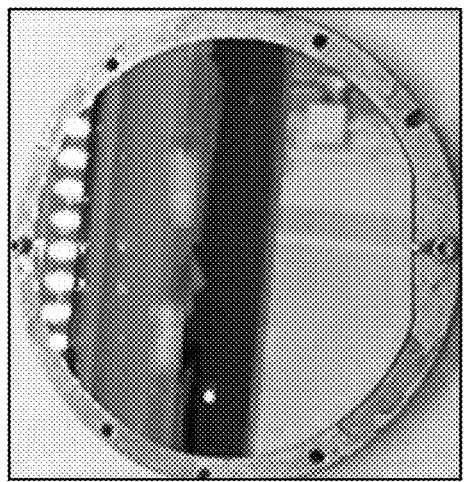
Figure 11C:
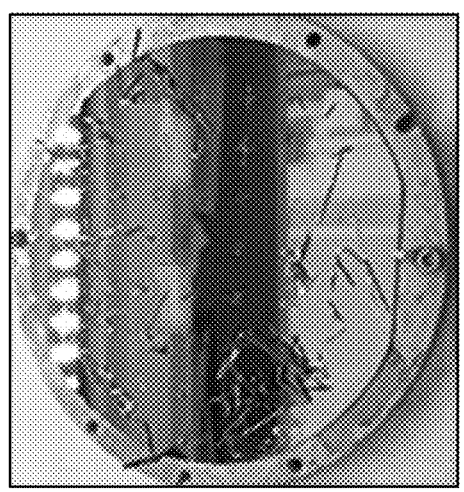

In particular, FIG. 10 shows variations in Ar pressure and deposition time for Ti/Nichrome deposition, and the resulting film conditions and film stress measurements. While Ar pressure of 1.5 mTorr and a deposition time of 34 min resulted in peeling off of the film at the center, and a higher film stress just over 158.7 MPa, lowering Ar pressure to 1.3 mTorr and deposition time to 30 min resulted in a clean film with no peeling or delamination and a lower film stress of just over 132.5 MPa.

As further shown in FIGS. 11A-D crack-free deposition parameters with reasonably low tensile stress of film were determined for Constantan and Nichrome. In addition, back side etching conditions of silicon was carried out to make freestanding silicon nitride (SiNx) membranes 16. The biggest potential problem that arose was stress mismatch between metal layers and the SiNx membrane 16, since this could potentially induce the failure of sensors. According to embodiments of the present invention, the thickness of the SiNx membrane 16 and the stress in the membrane can be optimized to prevent instabilities in the membrane. According to another embodiment approach, a flexible polyimide film (Kapton 500HN) was utilized as a membrane 16. Such a flexible polyimide film has about 100 times lower thermal conductivity than SiNx, thus making it unnecessary to carry out additional etching on the back side of metal layers.

Figure 12:
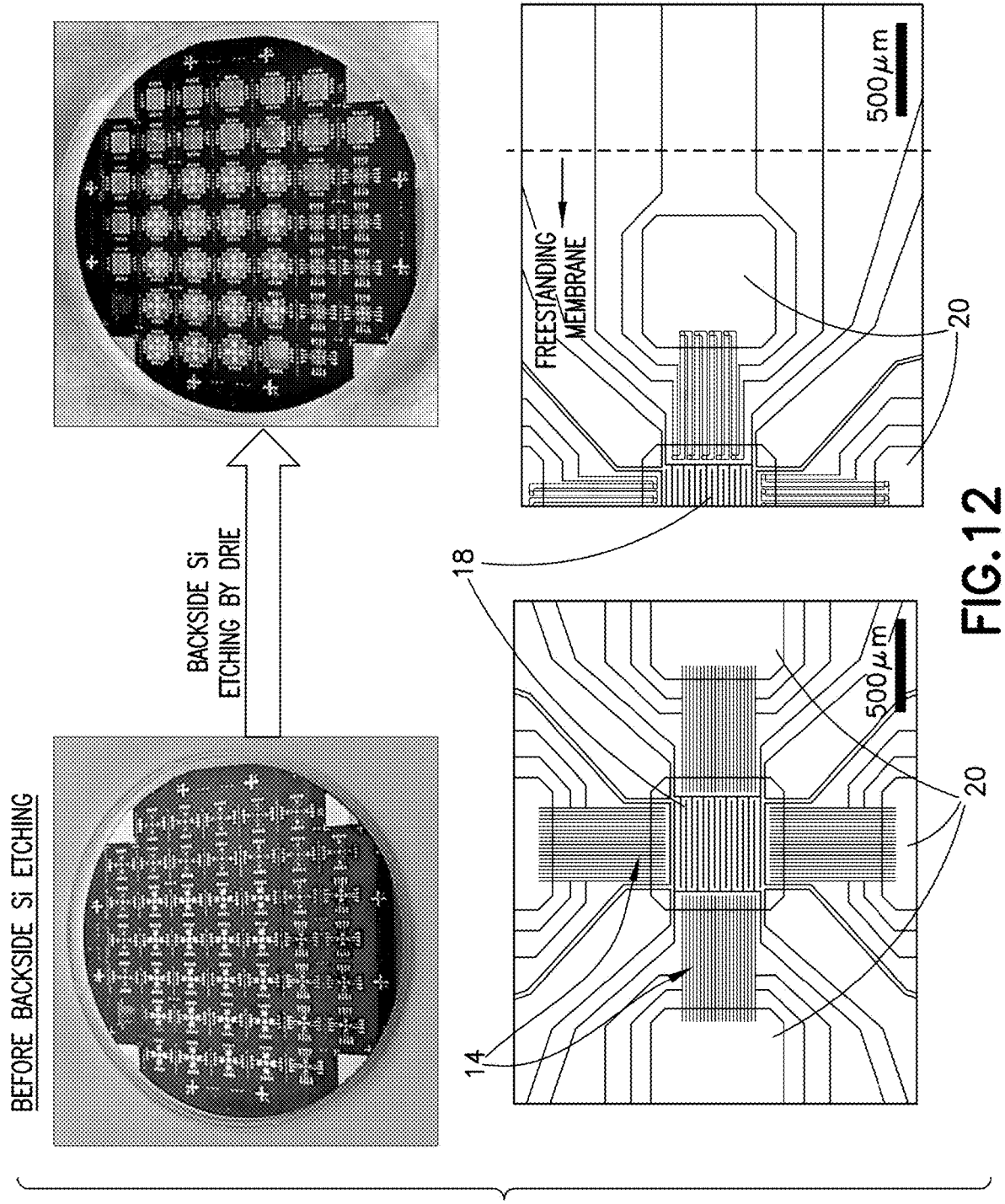
FIG. 12 illustrates sensor structure prior to and subsequent to backside etching and micrographs, according to an embodiment of the present invention.
Figure 13:
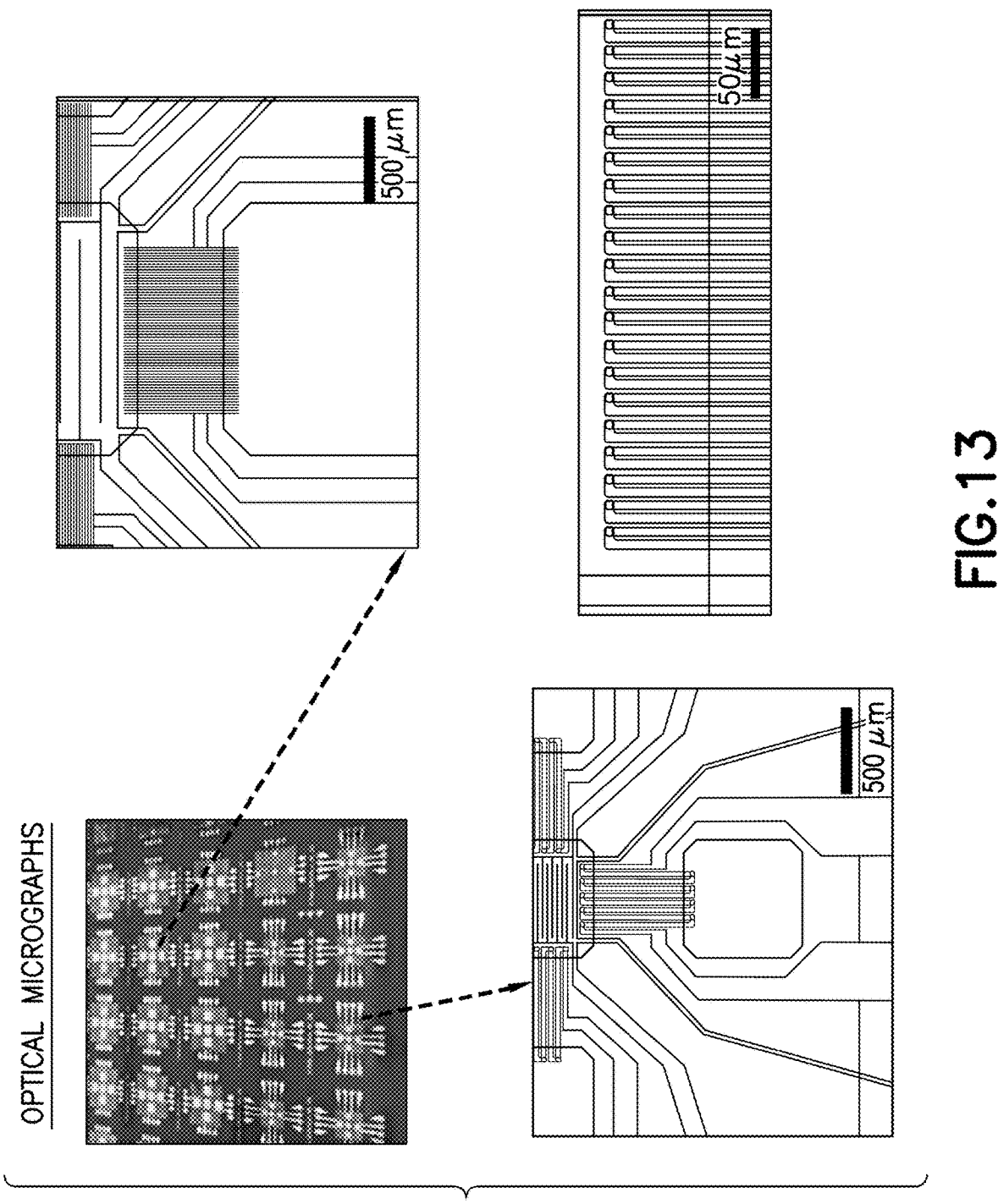
FIG. 13 shows optical micrographs of thermopile alignments in a microcalorimetric sensor according to an embodiment of the present invention.

FIG. 12 illustrates an embodiment of the sensor structure according to one embodiment of the present invention prior to and subsequent to backside Si etching using a deep reactive ion etching (DRIE) process. Optical micrographs of the final structure of a microcalorimetric sensor according to an embodiment of the present invention are shown in FIG. 13.

Figure 14:
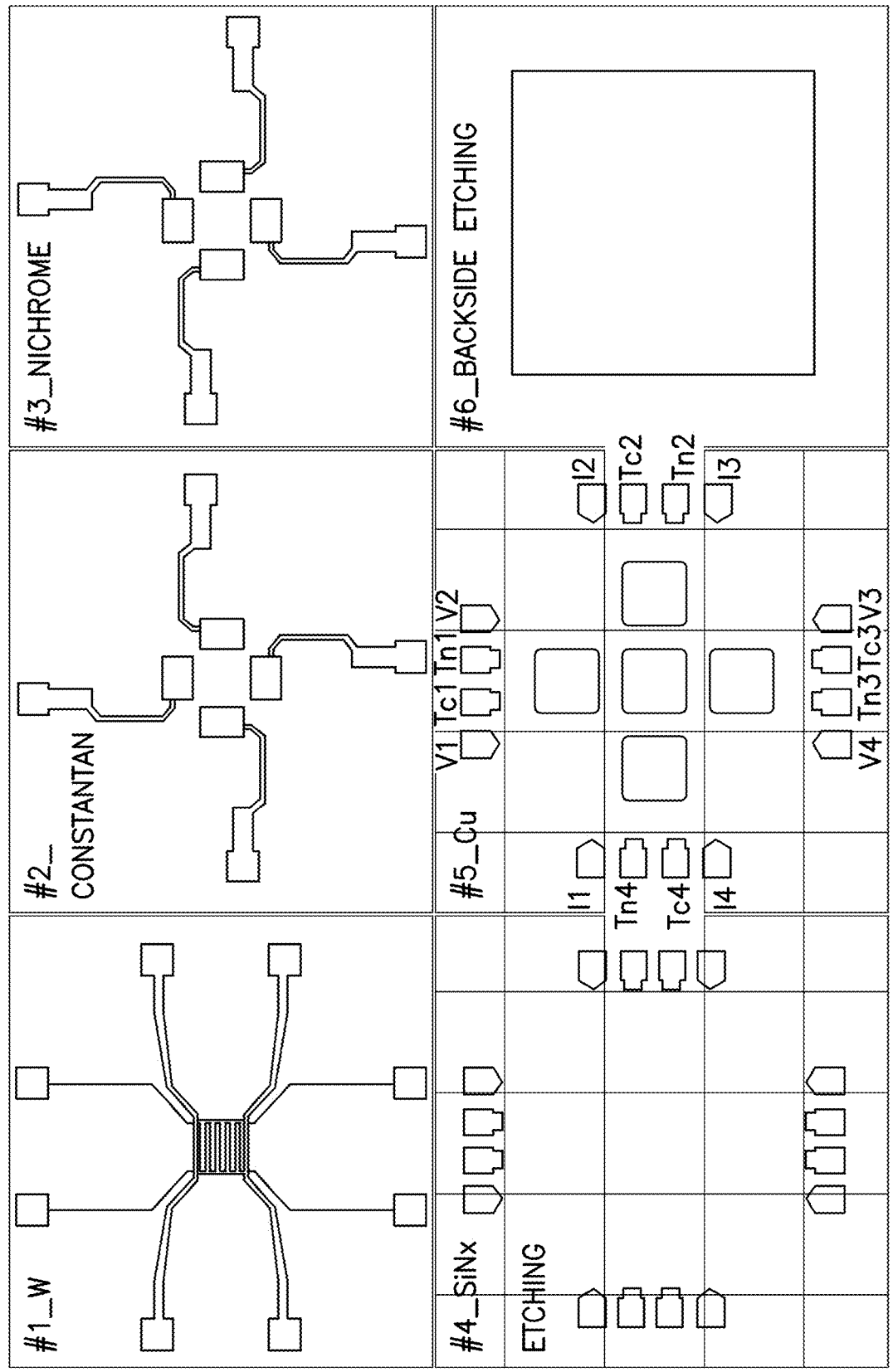
FIG. 14 schematically illustrates sensor fabrication utilizing six photomasks, according to an embodiment of the present invention.

According to embodiments of the present invention, the present microcalorimeter sensor can be fabricated using a silicon micromachining technique in which a multi-step etching and deposition process is carried out utilizing a series of photomasks. For example, as depicted in FIG. 14, sensor fabrication can take place using a multi-step etching process and a series of six photomasks to produce each individual sensor structure. A plurality of individual sensor structures can then be provided in any number and configuration to provide a desired microcalorimeter design.

Figure 15:
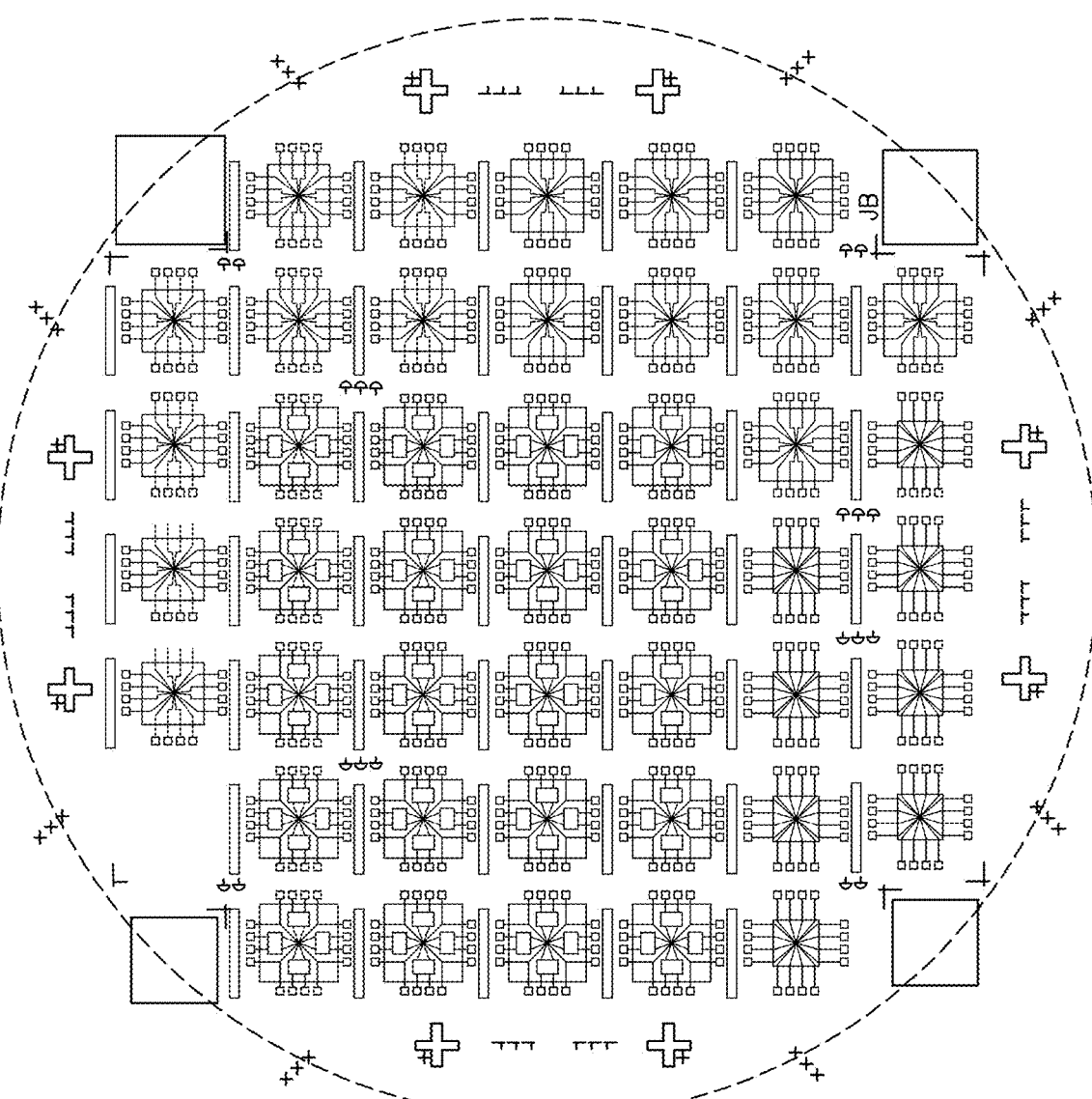
FIG. 15 schematically illustrates the overall alignment of a thermopile based microcalorimeter design having forty four sensors in a four inch wafer, according to an embodiment of the present invention.

One exemplary thermopile based microcalorimeter design according to the present invention is illustrated in FIG. 15. As shown, this design provides forty four sensors, in which each of the individual sensors is in the form of a sample loading area 18 disposed in the center with a heating element 12 positioned directly beneath the sample loading area 18, and four separate reference loading areas 20 disposed about the central sample loading area 18 (e.g., as depicted in FIGS. 5A and 6A). In the schematic illustration of FIG. 15, the forty four sensors are disposed on a four inch wafer, although the present invention is not limited to this specific design.

According to embodiments of the present invention, ten different designs of thermopile based calorimeter sensors are provided as set out in Table 1 below.

TABLE 1

Thermopile Based Calorimeter Sensor Designs

| Sample Diameter (2a)(mm) | Length of Thermopile (L)(μm) | Width of Thermopile (w)(μm) | Number Thermopiles (n)(μm) | Number of Sensors |
|---|---|---|---|---|
| 1.5 (V ~1 μL) | 0.525 | 5 | 51 | 5 of each |
| | | | 13 | |
| | | 20 | 9 | |
| | | | 5 | |
| 0.7 (V ~0.1 μL) | 0.525 | 5 | 20 | 4 of each |
| | | 20 | 5 | |
| | 1.5 | 5 | 20 | |
| | (24% lower resolution) | 20 | 5 | |
| | 2 | 5 | 20 | |
| | (41% lower resolution) | 20 | 5 | |

A device process flow for a thermopile based microcalorimeter sensor according to an embodiment of the present invention is described below. In this process flow, particular specifications are utilized. However, it is to be understood that similar conventional materials, measurements, and deposition methods could be substituted for the specific ones set forth below.

The overall fabrication flow is in accordance with that set out in FIG. 7 to produce the structure illustrated in FIG. 7. In particular: Ti/W (5/120 nm) as a heating element →Ti/Nichrome (5/500 nm) thermopile deposition →Ti/Constantan (5/500 nm) thermopile deposition→ALD $HfO_2$ (30 nm) & PECVD SiNx (300 nm)→dry etching of $HfO_2$ (new mask)→Ti/Cu (5/1 μm)→PECVD SiNx (100 nm)→Vacuum anneal→backside etching. As a general note, when placing the device down on a hard surface (e.g. glassware or metal plate) it is important to protect the nitride layer with something soft (e.g. a clean wipe or plastic).

A. Wafer Preparation (DI Water, $N_2$)

In a first step, a clean 4 inch SiN wafer with 300 nm super low stress LPCVD nitride (stress <100 MPa) was prepared using deionized water and/or Na. In this preparation step, special care was taken not to scratch the SiN on either side of the wafer. An additional deposition of 300 nm LPCVD low stress nitride was deposited onto the wafer (stress 228 MPa).

B. Tungsten (Heating Element) Deposition by AJA Magnetron Sputtering (Photo-Mask, Lift Off)

In this next step, a tungsten heating element was deposited onto the prepared wafer surface using AJA magnetron sputtering.

(1) Front Side (FS) Photoresist Coating (at a Positive/Negative Photoresist Station)

In order to clean a contaminated wafer, it was placed in an ultrasonic bath: acetone 5 min, isopropanol 5 min, deionized water 5 min and baked for 1.5 min at 115° C. If the wafer is clean, then simple nitrogen blowing was carried out. Next, spin coating of using Shipley 1813 photoresist (dynamic dispense) was carried out using the following specifications: first a spread cycle: 500 rpm (ramp rate: 100 rpm/sec) was carried out for 5 sec, followed by a spin cycle: 3500 rpm (ramp rate: 800 rpm/sec) for 40 sec. Using this technique an expected thickness at 3.5 krpm is about 1.5 μm. After spin coating, the resultant wafer was soft baked for 2 minutes at 115° C., with the back side facing downwards. Following baking, the wafer was cooled on a clean foil sheet and wiped.

(2) Lithography

The lithography step included using a Suss MA-6 Mask Aligner for FS alignment→18.5 sec at 8.1 mW/cm2 to give 150 mJ/cm2 ([W]=[J/s]) (Exposure time [sec]=required UV dose/UV intensity of h-line (405 nm)). Front side patterning was carried out by using a mask of Ti/W. A developing process was conducted using Micro-Developer:water=1:1 mixture (2 cups for each) solution for 1 min or microposit developer CD-30 (Shipley, product code 30340) for 1 min. Thereafter, the wafer was rinsed with deionized water followed by nitrogen blowing and optical inspection.

(3) Ti/W (Heating Element) Deposition (AJA Sputter)

Before deposition, dust was blown off the surfaces of the wafer. Using a working distance (height) of 64 mm, a tilt of 12.5 mm, and a run speed of 3 mark ~10 rpm, sputter cleaned substrate (Ar cleaning): pressure 20 mTorr/Ar power 24 W/time 3 min. Ti was deposited at a pressure of 3 mTorr, a power of 200 W DC, for 1.5 min, to obtain a deposition thickness of about 5 nm. W was deposited at a pressure of 5 mTorr, a power of 155 W DC, for 11 min, to obtain a thickness of about 120 nm.

4) Lift Off (at General Wet Process Station)

Preparation included 2 glass baths using a wafer tweezer. The wafer was placed in an acetone bath for 1 hr in a sonicator (while checking the water level, conducted at a power level ~9). While in the acetone bath, an isopropanol bath was prepared in advance for the next step. The wafer was then taken out of the acetone bath and immediately put into the isopropanol bath since acetone can contaminate the wafer as it evaporates. The wafer was left in the isopropanol bath for 5 min, using sonication for 1 min first, if necessary. A swab was run over the patterning area as necessary. Before taking the wafer out of the IPA, a deionized water bath was prepared. After an isopropanol rinse, the wafer was put into the deionized water bath for 5 min. A gentle rinse by a deionized water spray was carried out, followed by nitrogen blowing and optical inspection. If there were leftover materials at this point, the wafer was passed through the acetone bath for another 5 minutes with sonication (swab rubbing), followed by a repeat of the isopropanol and deionized water rinse and nitrogen blowing.

C. Nichrome (Thermopile) Deposition by AJA Magnetron Sputtering (Photo-Mask, Lift Off)

(1) Front Side (FS) Photoresist Coating (at Positive/Negative Photoresist Station)

Once the wafer was clean, then nitrogen blowing was carried out. Spin coating using Shipley 1813 photoresist (dynamic dispense) was carried out using the following specification: a spread cycle carried out at 500 rpm (ramp rate: 100 rpm/sec) for 5 seconds, and then a spin cycle was carried out at 3500 rpm (ramp rate: 800 rpm/sec) for 40 seconds. After spin coating, the wafer underwent a soft bake for 2 min at 115° C., with the wafer back side down. After baking, the wafer was cooled on a clean foil sheet.

(2) Lithography

The lithography step included using a Suss MA-6 Mask Aligner for FS alignment→18.5 sec at 8.1 mW/cm2 to give 150 mJ/cm2 ([W]=[J/s]) (Exposure time [sec]=required UV dose/UV intensity of h-line (405 nm)). Front side patterning was carried out by using a mask of Ti/Nichrome. A developing process was conducted using Micro-Developer:water=1:1 mixture (2 cups for each) solution for 1 min or CD30 for 1 min. Thereafter, the wafer was rinsed with deionized water followed by nitrogen blowing and optical inspection.

(3) Ti/Nichrome (80% Ni & 20% Cr) Deposition (AJA Sputter)

Before deposition, dust was blown off the surfaces of the wafer. Using a working distance (height) of 64 mm, a tilt of 12.5 mm, and a run speed of 3 mark ~10 rpm, sputter cleaned substrate (Ar cleaning): pressure 20 mTorr/Ar power 24 W/time 3 min. Ti was deposited at a pressure of 3 mTorr, a power of 200 W DC, for 1.5 min, to obtain a deposition thickness of about 5 nm. Nichrome was deposited at a pressure of 1.5 mTorr, a power of 200 W DC, for 34 min, to obtain a thickness of about 500 nm.

(4) Lift Off (at General Wet Process Station)

Preparation included 2 glass baths using a wafer tweezer. The wafer was placed in an acetone bath for 1 hr in a sonicator (while checking the water level, conducted at a power level ~9). While in the acetone bath, an isopropanol bath was prepared in advance for the next step. The wafer was then taken out of the acetone bath and immediately put into the isopropanol bath since acetone can contaminate the wafer as it evaporates. The wafer was left in the isopropanol bath for 5 min, using sonication for 1 min first, if necessary. A swab was gently run over the patterning area as necessary. Before taking the wafer out of the IPA, a deionized water bath was prepared. After an isopropanol rinse, the wafer was put into the deionized water bath for 5 min. A gentle rinse by a deionized water spray was carried out, followed by nitrogen blowing and optical inspection. If there were leftover materials at this point, the wafer was passed through the acetone bath for another 5 minutes with sonication (swab rubbing), followed by a repeat of the isopropanol and deionized water rinse and nitrogen blowing.

D. Constantan (Thermopile) Deposition by AJA Magnetron Sputtering (Photo-Mask, Lift Off)

(1) Front Side (FS) Photoresist Coating (at Positive/Negative Photoresist Station)

Once the wafer was clean, then nitrogen blowing was carried out. Spin coating using Shipley 1813 photoresist (dynamic dispense) was carried out using the following specifications: a spread cycle carried out at 500 rpm (ramp rate: 100 rpm/sec) for 5 seconds, and then a spin cycle was carried out at 3500 rpm (ramp rate: 800 rpm/sec) for 40 seconds. After spin coating, the wafer underwent a soft bake for 2 min at 115° C., with the wafer back side down. After baking, the wafer was cooled on a clean foil sheet.

(2) Lithography

The lithography step included using a Suss MA-6 Mask Aligner for FS alignment→18.5 sec at 8.1 mW/cm2 to give 150 mJ/cm2 ([W]=[J/s]) (Exposure time [sec]=required UV dose/UV intensity of h-line (405 nm)). Front side patterning was carried out by using a mask of Ti/Constantan. A developing process was conducted using Micro-Developer:water=1:1 mixture (2 cups for each) solution for 1 min or CD30 for 1 min. Thereafter, the wafer was rinsed with deionized water followed by nitrogen blowing and optical inspection.

(3) Ti/Constantan (55% Cu & 45% Ni) Deposition (AJA Sputter in Our Lab)

Before deposition, dust was blown off the surfaces of the wafer. Using a working distance (height) of 64 mm, a tilt of 12.5 mm, and a run speed of 3 mark ~10 rpm, sputter cleaned substrate (Ar cleaning): pressure 20 mTorr/Ar power 24 W/time 3 min. Ti was deposited at a pressure of 3 mTorr, a power of 200 W DC, for 1.5 min, to obtain a deposition thickness of about 5 nm. Constantan was deposited at a pressure of 1.3 mTorr, a power of 200 W DC, for 31 min, to obtain a thickness of about 500 nm.

(4) Lift Off (at General Wet Process Station)

Preparation included 2 glass baths using a wafer tweezer. The wafer was placed in an acetone bath for 1 hr in a sonicator (while checking the water level, conducted at a power level ~9). While in the acetone bath, an isopropanol bath was prepared in advance for the next step. The wafer was then taken out of the acetone bath and immediately put into the isopropanol bath since acetone can contaminate the wafer as it evaporates. The wafer was left in the isopropanol bath for 5 min, and a swab was gently run over the patterning area as necessary. Before taking the wafer out of the IPA, a deionized water bath was prepared. After an isopropanol rinse, the wafer was put into the deionized water bath for 5 min. A gentle rinse by a deionized water spray was carried out, followed by nitrogen blowing and optical inspection. If there were leftover materials at this point, the wafer was passed through the acetone bath for another 5 minutes with sonication (swab rubbing), followed by a repeat of the isopropanol and deionized water rinse and nitrogen blowing.

E. $H_fO_2/Si_3N_4$ Deposition by ALD/PECVD on W and Constantan/Nichrome Thermopile Layers with Opening Regions (Dry Etching) (for Insulating Between W or Thermopile, and Cu)

(1) ALD $H_fO_2$ (30 nm)

$H_fO_2$ was deposited using atomic layer deposition (ALD) to a thickness of 30 nm according to the following standard specifications—Inner heater temperature: 200° C., Outer heater temperature: 150° C., number of cycle: 323, where each cycle consists of: $H_2O$ pulse for 0.015 sec, wait for 10 sec, $H_fO_2$ precursor pulse for 0.3 sec, and wait for 10 sec. The process was carried out so as to open $H_fO_2$ at 200 A, and then the cycle number was changed to 300 A. (cycle #323 for 300 A)

(2) PECVD Deposition of Nitride (CVD-2 Nexx PECVD)

This process is for FS capping to prevent oxidation of W, and to protect from sample fluids. Plasma was first used to clean the wafer surface to improve adhesion. A pre-deposition bake was carried out for 1.5 min at 115° C. PECVD was carried out with microwave power set at 265 W, and flow rates (sccm): 3% SiH4 (in Ar)=40, N2=5.8, Ar=20, under working pressure=10 mTorr, to deposit nitride. The PECVD was carried out for 2308 sec (=38.46 min), to deposit a layer of height ~300 nm (rate for SiNLST-7.8 nm/min).

(3) Front Side (FS) Photoresist Coating (at Positive/Negative Photoresist Station)

Once the wafer was clean, then nitrogen blowing was carried out. Spin coating using Shipley 1813 photoresist (dynamic dispense) was carried out using the following specifications: a spread cycle carried out at 500 rpm (ramp rate: 100 rpm/sec) for 5 seconds, and then a spin cycle was carried out at 3500 rpm (ramp rate: 800 rpm/sec) for 40 seconds. After spin coating, the wafer underwent a soft bake for 2 min at 115° C., with the wafer back side down. After baking, the wafer was cooled on a clean foil sheet.

(4) Lithography

The lithography step included using a Suss MA-6 Mask Aligner for FS alignment →18.5 sec at 8.1 mW/cm2 to give 150 mJ/cm2 ([W]=[J/s]) (Exposure time [sec]=required UV dose/UV intensity of h-line (405 nm)). Front side patterning was carried out by using a mask of SiNx. A developing process was conducted using Micro-Developer:water=1:1 mixture (2 cups for each) solution for 1 min or CD30 for 1 min. Thereafter, the wafer was rinsed with deionized water followed by nitrogen blowing and optical inspection.

(5) Dry etching on SiNx

Dust was first removed from the wafer surface using nitrogen blowing. In this step, conventional parameters for SiNx etching were used, and the etching rate was checked by using a dummy sample of SiNx. The etching was carried out to apply 150-200% of the etching rate. The process was run for a total time of 4.5-5 min. The surface was then cleaned for about 20 min. The process was run for 10 min with a 6 inch carrier before mounting the wafer, which was mounted with a dummy sample (4 small pieces of $H_2O_2$/PECVD 30/300 nm layer). The process was then run for a total time of 4.5-5 min (30 sec or 1 min for each run). After each run, the resistance was checked by a multimeter, and the etching depth was measured by ellipsometer. Upon completion, the wafer was optically inspected.

(6) Removing PR

Preparation included 2 glass baths using a wafer tweezer. The wafer was placed in an acetone bath for 1 hr in a sonicator (while checking the water level, conducted at a power level ~9). While in the acetone bath, an isopropanol bath was prepared in advance for the next step. The wafer was then taken out of the acetone bath and immediately put into the isopropanol bath since acetone can contaminate the wafer as it evaporates. The wafer was left in the isopropanol bath for 5 min without sonication, and a swab was gently run over the patterning area as necessary. Before taking the wafer out of the IPA, a deionized water bath was prepared. After an isopropanol rinse, the wafer was put into the deionized water bath for 5 min without sonication. A gentle rinse by a deionized water spray was carried out, followed by nitrogen blowing and optical inspection. If there were leftover materials at this point, the wafer was passed through the acetone bath for another 5 minutes with sonication (swab rubbing), followed by a repeat of the isopropanol and deionized water rinse and nitrogen blowing.

F. Copper Deposition on the Probe Panels and Sample/Reference Pads to Reduce the Resistance by AJA Magnetron Sputtering (Photo-Mask, Lift Off) (Also to Enhance Temperature Uniformity on Sample Area)

(1) Front Side (FS) Photoresist Coating (at Positive/Negative Photoresist Station)

Once the wafer was clean, then nitrogen blowing was carried out. Spin coating using Shipley 1813 photoresist (dynamic dispense) was carried out to deposit Cu to a thickness of about 1 μm, and increasing PR (photoresist) thickness to 2 μm, with the spread cycle carried out at 500 rpm (ramp rate: 100 rpm/sec) for 5 seconds, and the spin cycle was carried out at 2000 rpm (ramp rate: 800 rpm/sec) for 45 seconds, to provide a thickness of 1.9 μm at 2 krpm. After spin coating, the wafer underwent a soft bake for 2 min at 115° C., with the wafer back side down. After baking, the wafer was cooled on a clean foil sheet.

(2) Lithography

The lithography step included using a Suss MA-6 Mask Aligner for Front side alignment →18.5 sec at 8.1 mW/cm2 to give 150 mJ/cm2 ([W]=[J/s]) (Exposure time [sec]=required UV dose/UV intensity of h-line (405 nm)). FS patterning was carried out by using a mask of Ti/Cu on the thermopile. A developing process was conducted using Micro-Developer:water=1:1 mixture (2 cups for each) solution for 1 min or CD30 for 1 min. Thereafter, the wafer was rinsed with deionized water followed by nitrogen blowing and optical inspection.

(3) Cu Deposition on Opening Regions of SiNx (AJA Sputter)

Before deposition, dust was blown off the surfaces of the wafer. Using a working distance (height) of 64 mm, a tilt of 12.5 mm, and a run speed of 3 mark ~10 rpm, sputter cleaned substrate (Ar cleaning): pressure 20 mTorr/Ar power 24 W/time 3 min. Ti was deposited at a pressure of 3 mTorr, a power of 200 W DC, for 1.5 min, to obtain a deposition thickness of about 5 nm. Cu was deposited at a pressure of 5 mTorr, a power of 200 W DC, for min, to obtain a thickness of about 1.2 μm.

(4) Lift Off (at General Wet Process Station)

Preparation included 2 glass baths using a wafer tweezer. The wafer was placed in an acetone bath for 1 hr in a sonicator (while checking the water level, conducted at a power level ~9). While in the acetone bath, an isopropanol bath was prepared in advance for the next step. The wafer was then taken out of the acetone bath and immediately put into the isopropanol bath since acetone can contaminate the wafer as it evaporates. The wafer was left in the isopropanol bath for 5 min without sonication, and a swab was gently run over the patterning area as necessary. Before taking the wafer out of the IPA, a deionized water bath was prepared. After an isopropanol rinse, the wafer was put into the deionized water bath for 5 min without sonication. A gentle rinse by a deionized water spray was carried out, followed by nitrogen blowing and optical inspection. If there were leftover materials at this point, the wafer was passed through the acetone bath for another 5 minutes with sonication (swab rubbing), followed by a repeat of the isopropanol and deionized water rinse and nitrogen blowing.

G. $Si_3N_4$ Deposition by PECVD onto Cu Layer (1) PECVD deposition of $Si_3N_4$ This process is for front side capping to prevent oxidation of W, and to protect from sample fluids. Plasma was first used to clean the wafer surface to improve adhesion. A pre-deposition bake was carried out for 1.5 min at 115° C. PECVD was carried out with microwave power set at 265 W, and flow rates (sccm): 3% $SiH_4$ (in Ar)=40, N2=5.8, Ar=20, under working pressure=10 mTorr, to deposit nitride. The PECVD was carried out for 769 sec (=12.82 min), to deposit a layer of height ~100 nm (rate for SiNLST-7.8 nm/min).

(2) Vacuum Anneal: 8 Hours at 450 C (MRF Furnace)

The wafer was placed in the furnace, ensuring that a gap remained between the wafer and heating medium (the wafer is not to be placed directly onto the heating plate). The current value was set at 250 A to reach 450° C.

H. Etching the Back Side of Silicon Wafer by DRIE to Make Freestanding Membrane (1) Back Side (BS) Resist Coating (Positive/Negative Photoresist Station)

A Microposit Primer was utilized in this step (MPHP microprime HP-primer HMDS, UN2924), with a spread cycle of 5 seconds ramp to 500 rpm (ramp rate 100 rpm/s) for 5 seconds, and a spin cycle of 5 seconds ramp to 3000 rpm (ramp rate 600 rpm/s) for 30 seconds. Thereafter the wafer underwent a soft bake for 1 min at 115° C. Next a Shipley SPR220-7.0 photoresist was used while carrying out a spread cycle for 5 seconds ramp to 500 rpm (ramp rate: 100 rpm/sec) for 5 seconds, and a spin cycle for 5 seconds ramp to 3500 rpm (ramp rate: 800 rpm/sec) for 40 seconds. Thereafter, the wafer underwent a soft bake: 2 min @ 115° C.

(2) Lithography

The lithography step included using a Suss MA-6 Mask Aligner for back side (BS) alignment. The exposure time was 60 sec at 3.5 mW/cm$^2$ to give 210 mJ/cm$^2$ dose (UV intensity of i-line (365 nm)). BS patterning was carried out by using a BS mask, with alignment marks in the pattern used to perform BS alignment. A developing process was conducted using CD26 for 2 min (a color change was observed during development). Thereafter, the wafer was rinsed with deionized water followed by drying in nitrogen. A post exposure bake (PEB) was carried out at 115° C. for 2 minutes, followed by optical inspection.

(3) Dry Etching on SiNx (for Enhancing the Uniformity of Etching Depth Through the 4 Inch Wafer During DRIE)

The wafer was first cleaned for about 20 min, followed by the dry etching set out generally in section E(5) above. The process was run for 10 min with a dummy, followed by a run with the wafer for a total of 4-6 min (3 min first, then run additionally). After each run, the resistance was checked by a multimeter, Upon completion, the wafer was optically inspected.

(4) DRIE Etch on BS (4 Sec Process Time)

A new 6 inch, and 2 μm thick SiO, coated wafer was prepared. Nitrogen blowing was carried out before processing. A vacuum oil (1-2 drops on each etching area) was applied. The vacuum oil was used to attach the sample to the DRIE substrate. The sample was then baked at 80° C. for 4 min to spread the oil out, while carefully ensuring that the oil did not squeeze out upon heating because such oil leakage can seriously damage the surface of the sample during the DRIE process. DRIE etching was then carried out at a power of 40 W/150 Hz, a flow rate (sccm): SF6=660, working pressure=15 mTorr, for number of loops: 383 (etching rate 1.18 μm/loop), after 120 loops: Si started to expose, to an etching depth ~275 um of Si, 600 nm of SiNx and 7 μm photoresist (PR). The resultant was optically inspected (5) BS Resist Strip and Removing Vacuum Oil The fabricated wafer was then soaked in acetone overnight with tilting. Thereafter, the wafer was rinsed with isopropanol. Because the PEB and DRIE processes harden the photoresist, the wafer was held inside the acetone bath for sufficient time for proper removal. If the vacuum oil was removed from between the device and substrate, then the device slid down by tilting the substrate. At this point, if necessary, the wafer was rinsed one more time in the acetone bath, with the membrane facing upwards. Thereafter, the wafer was rinsed with IPA, with the membrane facing upwards to prevent it from touching to the bottom of the container. The wafer was then air dried in a wafer container with the membrane facing the bottom.

Surface coating for aqueous samples (biological/chemical samples) and oil droplets (covering aqueous sample droplets to prevent evaporation of sample droplets).

Perfluorooctyltrichlorosilane (PFOTS)→use 1 drop on a glass slide. Two samples put next to the glass slide (but not too close) and left for 20 hr (overnight) in the vacuum chamber.

Surface modifications of the microcalorimeteric sensors can further be carried out to tailor the wettability for direct deposition of fluid samples, and to test the biocompatibility of the treated surface in prior to handling biological samples.

Figure 16:
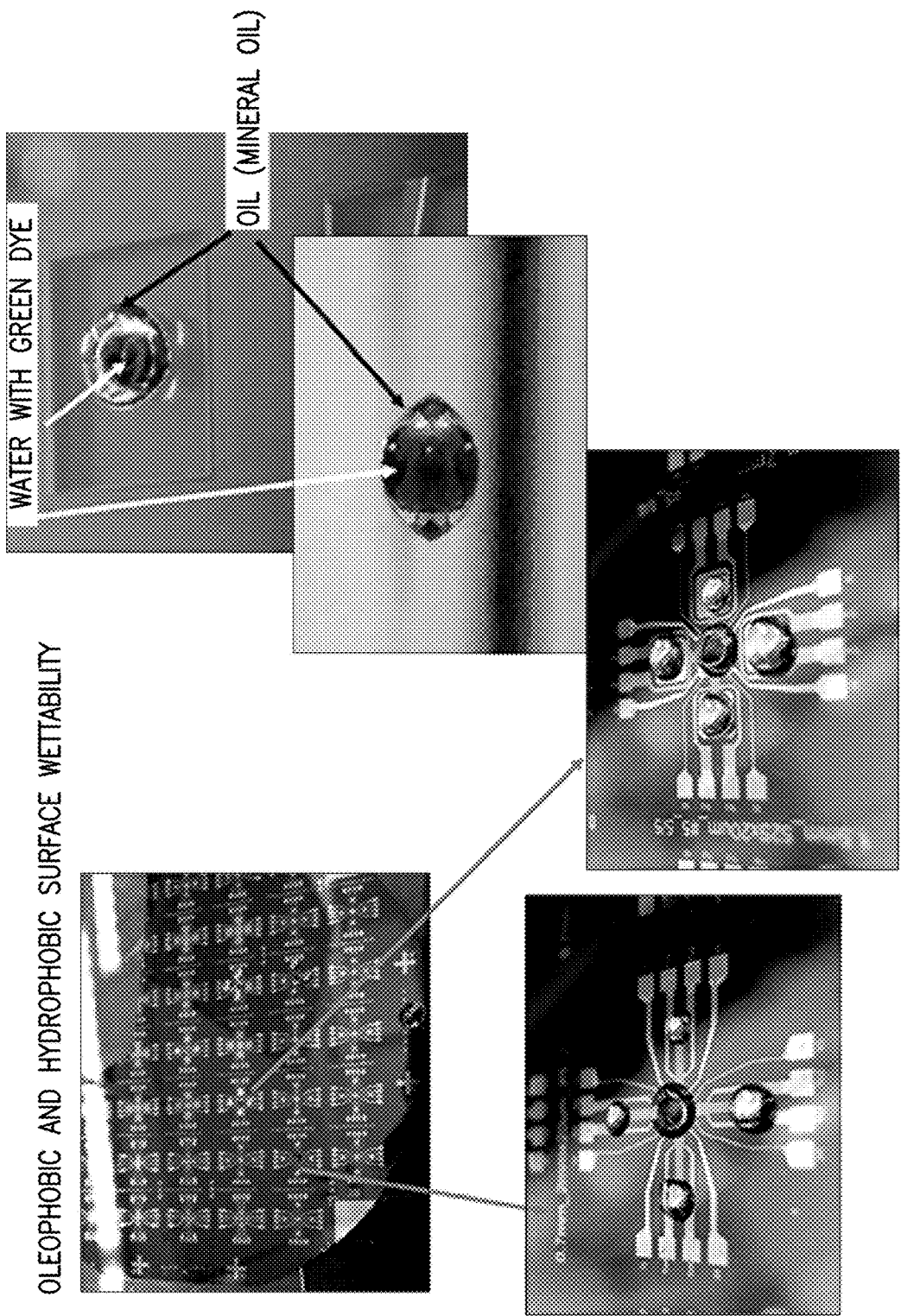
FIG. 16 illustrates a perfluorooctyltrichlorosilane (PFOTS) treated surface of a sensor for modifying the wettability to hydrophobic and oleophobic wettability, according to an embodiment of the present invention.

According to an embodiment, a PFTOS treated sensors were fabricated and were tested for oleophobic and hydrophobic surface wettability. As shown in FIG. 16, it was demonstrated that water droplets can be provided with samples on the sensor and that they can be protected from evaporating, from running off of the sensing area, and spreading. This was achieved by treating the surface with PFTOS. AS shown in FIG. 16, a water droplet surrounded by oil to prevent evaporation. The water was dyed green to make it more clearly visible. As depicted, the three-phase contact (droplet-substrate-air) lines were well pinned, thus allowing for the clear separation between a sample and references during measurement. In an untreated sensor surface, the oil spreads out (contact angle is close to zero).

The present invention further provides a measurement setup and a data acquisition (DAQ) system for the microcalorimeter measurements. Such a measurement setup and DAQ system must be capable of making very sensitive measurements and minimizing noise. According to various embodiments, a probe station with bidirectional imaging setup was provided for multi-probes alignment. A closed chamber for the probe station is further assembled in some embodiments. By designing the measurement setup and DAQ system as such, noise can be reduced and the gas conditions for measurements can be better controlled. One example of a DAS is illustrated in FIG. 17, and a schematic of a DAS is further illustrated in FIG. 18.

Microcalorimeter sensors of the present invention can be tested by using a built-in heating element in each sensor to allow for 1) calibrating thermopile response to power generated, 2) characterizing the sensitivity of the sensors as a function of sensor design, and 3) optimization of a DAQ system to maximize signal-to-noise ratio.

Figure 19:
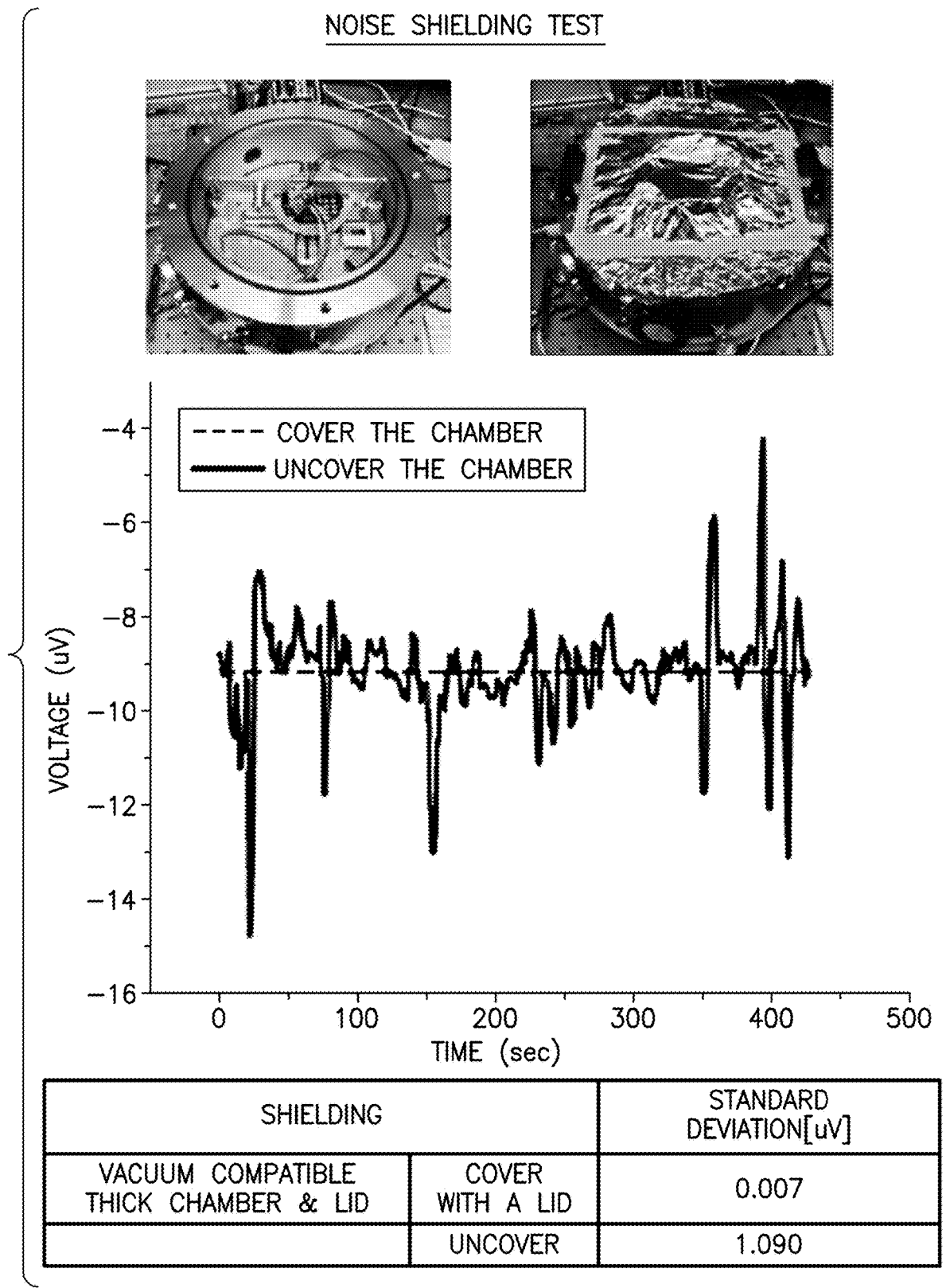
FIG. 19 illustrates a noise shielding test and results, according to an embodiment of the present invention.

A noise shielding test according to an embodiment of the invention is illustrated in FIG. 19, in which it is demonstrated that by covering the chamber housing the sensor, noise from the environment is significantly minimized. As depicted in the voltage vs. time graph, when the chamber is not covered, voltage fluctuates significantly (depicted by the red up and down line), while the covered chamber illustrates steady voltage (depicted by the straight black horizontal line).

Figure 20:
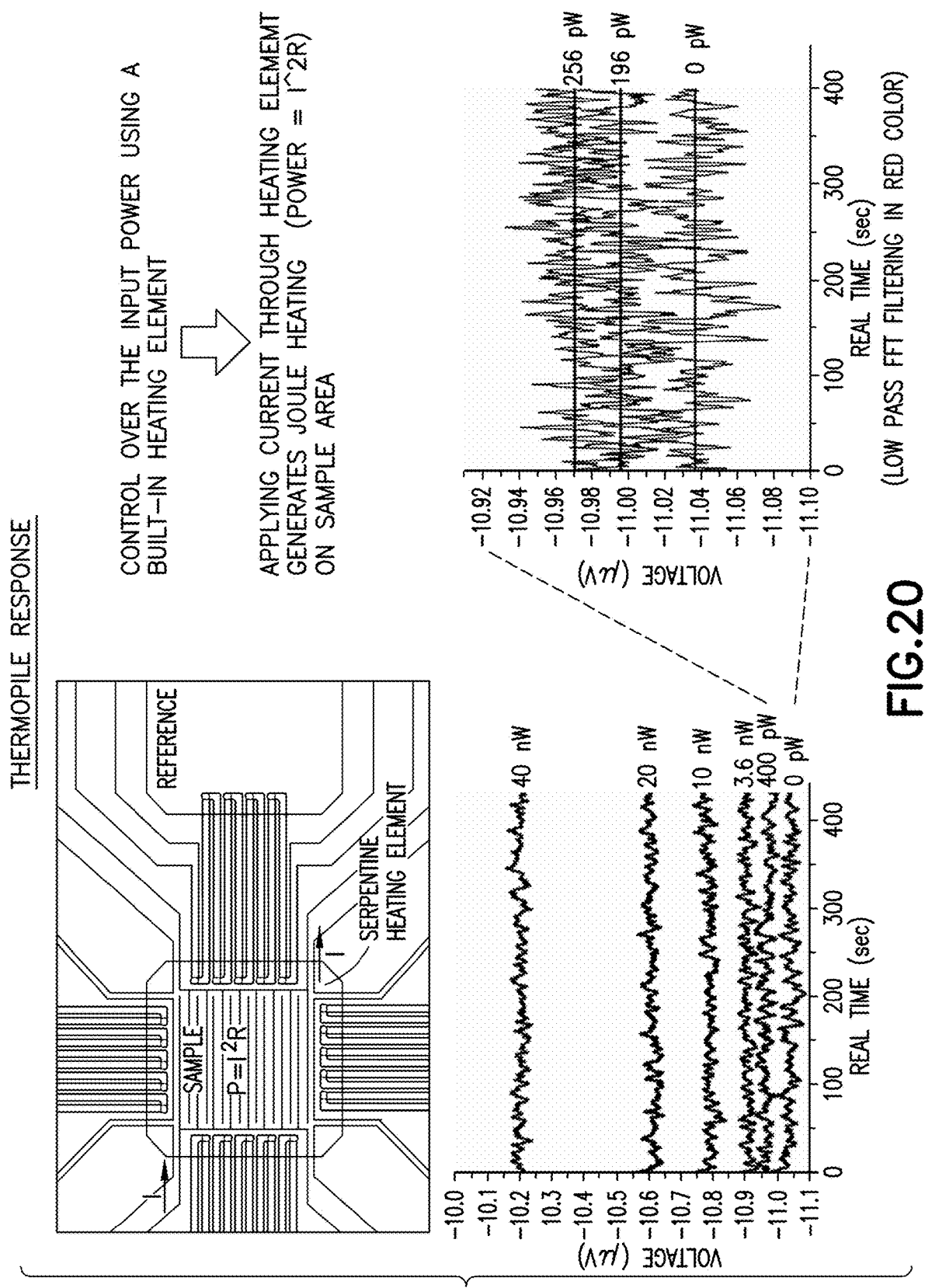
FIG. 20 illustrates a thermopile response using a built-in heating element in each sensor, and application of current to generate heating of a sample area, with the two bottom graphs depicting resolution, according to an embodiment of the present invention.

Further, thermopile response was tested by applying current through the heating element of the sensor to generate joule heating. The results are graphically depicted in FIG. 20.

The highly sensitive thermopile-based calorimeters of the present invention offer particular promise for quantitative measurement of cellular bioenergetics and systems that are limited in analytic volume. In particular embodiments, the present microcalorimeters can be utilized together with in vivo fluorescence lifetime imaging microscopy (FLIM) to provide improved quantitative measurement of cellular bioenergetics and systems. More generally, the present microcalorimeters are also useful in quantitatively measuring bio and nano-materials (e.g., inorganic nanoparticles, nanocatalysis, etc.).

In vivo fluorescence lifetime imaging microscopy (FLIM) is one current technique for studying cellular metabolic power (FIG. 1A). In this technique, as depicted in FIG. 1A, eggs and embryos from healthy ("young") and aged ("old") mice are studied to quantitatively measure the concentration and fraction bound to proteins of NADH and FAD. The quality of oocytes has been determined to decline as a mother ages, and is correlated with a deterioration of metabolic function, which is illustrated in FIG. 1A. NADH and FAD are the two central coenzymes in ATP production, and ATP is considered to be the energy currency of cells. As such, in vivo FLIM will provide a characterization of cellular energy production. According to an embodiment, as depicted in FIGS. 1A-C, the FLIM technique (FIG. 1A) can be combined with the present micromachined calorimeter technique (e.g., FIGS. 1B and 1C) to allow for quantitatively measuring energy production and consumption in a single cell in real time. In particular, the present invention thermopile-based pico calorimeter is capable of detecting temperature changes as small as $10^{-7}$ K, corresponding to 100 pWatt of power. For example, as shown in FIGS. 1B and 1C, a sample (with mouse eggs and embryos) is deposited in the central sample loading area 18 surrounded by references loaded in the four reference loading areas 20. According to the present invention, the sample loading area 18 with the sample loaded therein is disposed directly above the built-in heating element 12. Using the combination of the two techniques, quantitative measurement of cellular bioenergetics can be used to study a variety of metabolic perturbations of, for example, *Caenorhabditis elegans*, mouse embryos, and the like, in real time. In some embodiments, the present highly sensitive microcalorimetric sensors can further be integrated with either microfluidic channels or an electrostatic droplet merging technique to not only improve fluid handling, but also to study a variety of reactions by fluid mixing.

Meanwhile, various surface modifications of the microcalorimeteric sensor can be provided to tailor the wettability of the sensor for direct deposition of fluid samples, and test the biocompatability of the treated surface in prior to handling biological samples. Initial demonstrations include measuring the energy projection and consumption from *Xenopus* egg extracts, as well as studying metabolic perturbations of *Caenorhabditis elegans* and mouse embryos. Further, more advanced and complex fluid handling techniques can be provided for the microcalorimeter including, for example, microfluidics and electrostatic droplet mixing.

The present invention sensor response was tested by measuring output voltage from the thermopile as a function of power applied, as depicted in FIGS. 21A-C. According to the present sensor design, a serpentine shaped built-in heating element 12 was disposed underneath the sample provided in the sample loading area, which was surrounded by four reference loading areas (not shown). When certain current (I) levels are applied through the heating element 12, Joule heating $P=I^2R$ was generated. The resulting detected voltage demonstrated a linear relationship with input power as shown in FIG. 21B. The resulting sensitivity was 21 v/w, which is much more sensitive than conventional sensor designs. In addition, as demonstrated in FIG. 21C, the present invention sensors responded very quickly so that the response time was limited by measuring frequency.

In order to understand how the present invention sensors operate with biological samples, tests were performed using liquid samples. The response time was analyzed with different volumes of liquid droplets. Further, to eliminate other undesired effects due to evaporation of liquid, ionic liquid (1-Butyl-3-methylimidazolium hexafluorophosphate), which has no vapor pressure, was used. In the tests, an input power of 1 µW was used with no digital filter.

Figure 22B:
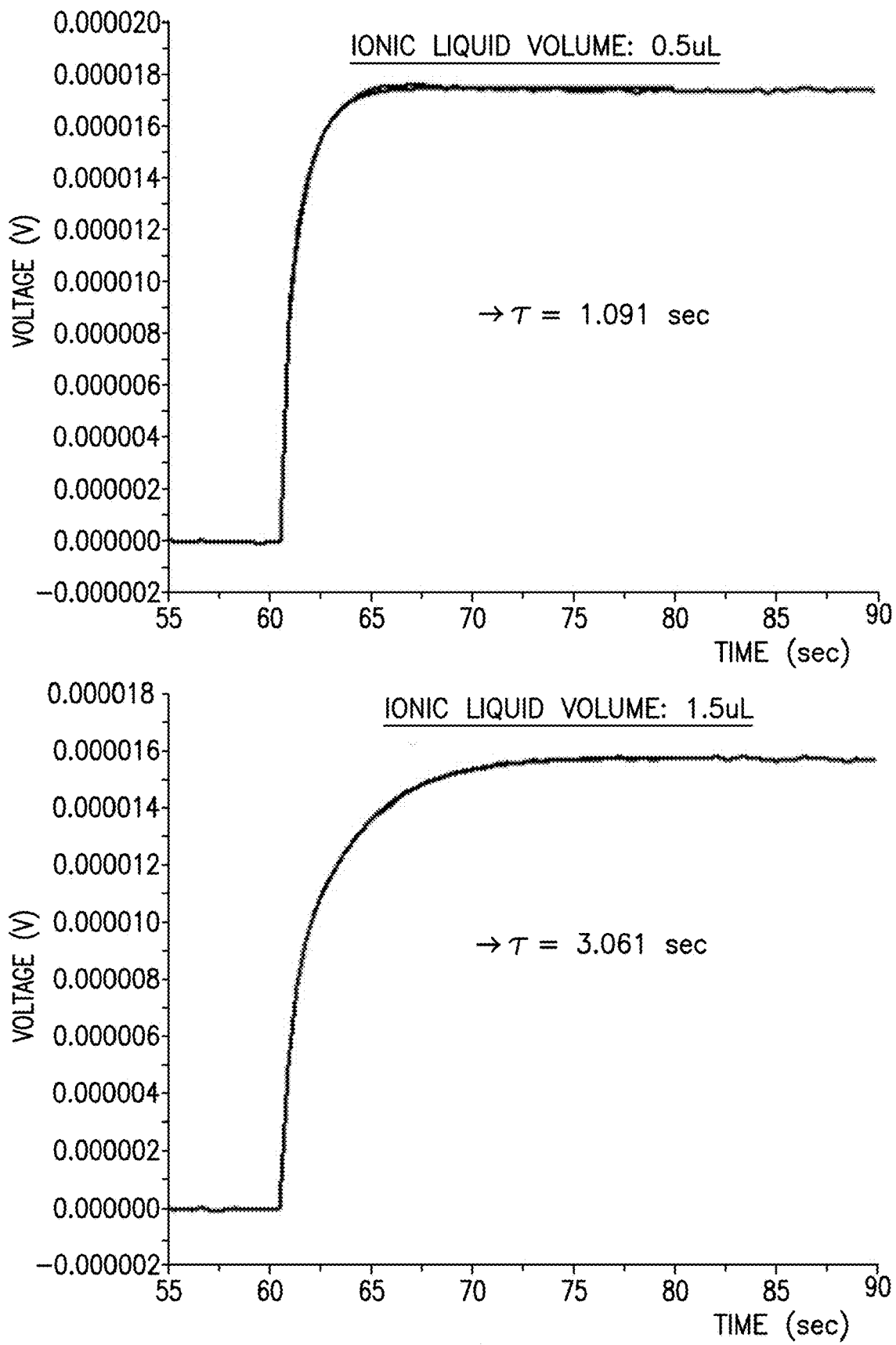
FIG. 22 illustrates the response time with different volumes of liquid droplets using ionic liquid (1-Butyl-3-methylimidazolium hexafluorophosphate), according to an embodiment of the present invention.

By exponential fitting on output voltage vs. time, the response time was calculated with different volumes: $V(t)=V_0(1-e^{-t/\tau})$. The results demonstrate a linear relationship with the volume of the droplet ~time constant τ. As noted above, the response time is limited by measuring frequency. As shown in FIG. 22, the response time of a blank state (i.e., no ionic liquid or sample) was shown to be 0.438 sec. This indicates that the real response time of the present invention sensor itself is much faster than 0.4 sec.

Figure 23:
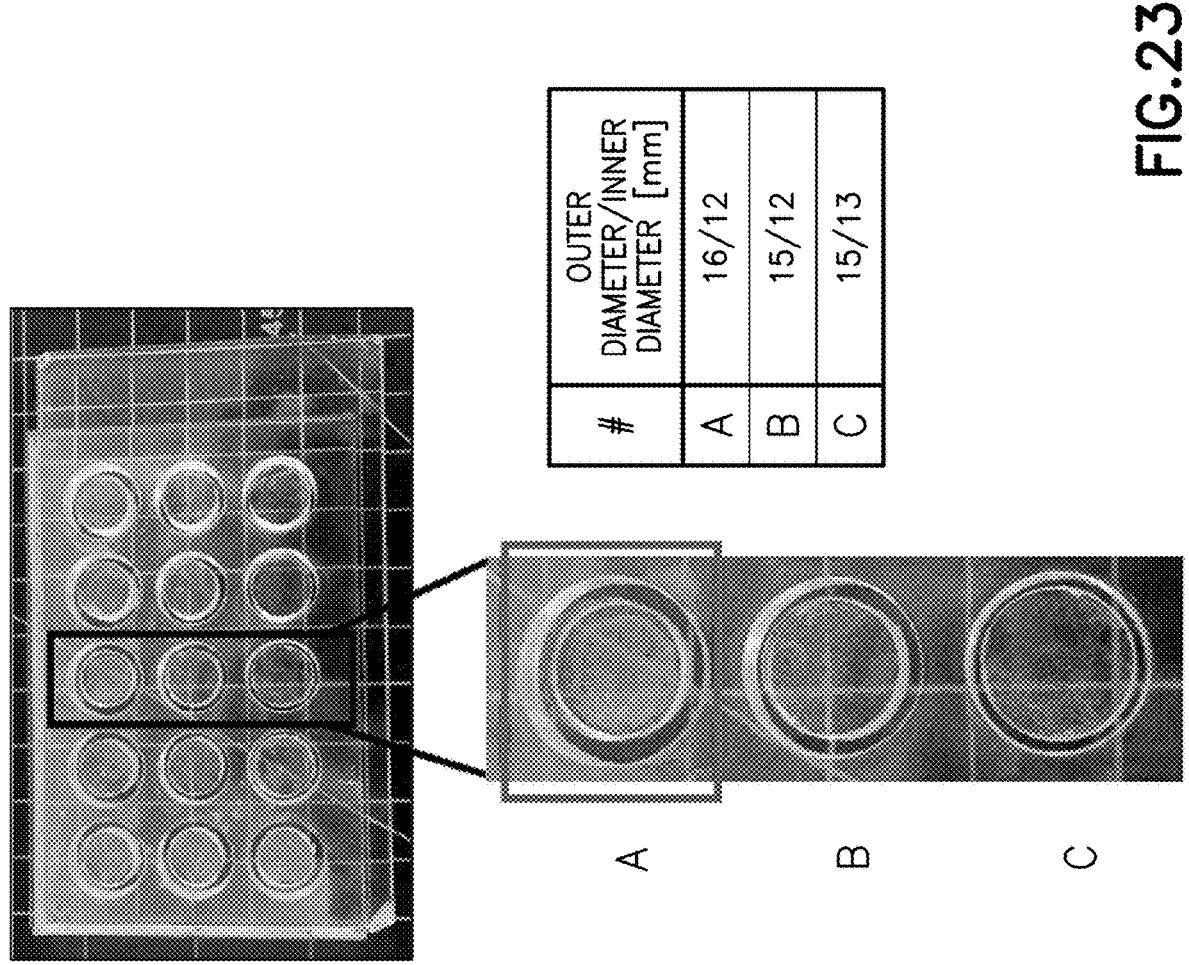
FIG. 23 illustrate three different hydrogel cylinder/rings of varying wall thickness. according to embodiments of the present invention.

In order to reduce the evaporation rate of liquid samples and references, hydrogel cylinders/rings were formed for placement surrounding individual sensor elements. In particular, an acrylic plate was laser cut to form molds for hydrogel curing. The molds included three different wall thickness to provide hydrogel cylinder/rings of varying wall thickness (depicted in FIG. 23): A which was provided with an outer diameter/inner diameter ratio (mm) of 16/12; B which was provided with an outer diameter/inner diameter ratio (mm) of 15/12; and C which was provided with an outer diameter/inner diameter ratio (mm) of 15/13.

The hydrogel cylinders/rings were formed using the below formulation, as illustrated by

TABLE 2

| Functions | Materials | Solution Concentration | Volume |
|---|---|---|---|
| Monomer | Acrylamide (AAm) | 15% w/v | 10 mL |
| Crosslinker | N,N'-Methylenebisacrylamide (MBAA) | 2% w/v | 1500 µL |
| Chemical Initiator | Ammonium Persulfate (APS) | 0.66 g/10 ml | 165 µL |
| Crosslink Accelerator | Tetramethylethylenediamine (TEMED) | As it is | 3.3 µL |

Table 2

All four materials were mixed, poured into the molds, and cured in the mold overnight. The cured gel rings were then from the mold and placed in deionized water overnight to swell. The hydrogel recipe for the linear swelling ratio= (length in swelled state/initial length)≈1.2.

Because liquid (water) diffusion time through a hydrogel wall is proportional to (wall thickness)^2, the thickest hydrogel cylinder (A) was used to minimize water evaporation during measurement.

To test whether there was a reduction in evaporation of aqueous droplets using the hydrogel rings/cylinders, fully swelled hydrogel cylinders were placed to surround the sensor as depicted in FIG. 24. Aqueous droplets (colored green) were deposited onto the sample and reference loading areas, and were then covered by oil droplets. As demonstrated, even after 4 hours, the size (volume) of green aqueous droplets were maintained.

Throughout several preliminary tests by using biological samples, it was demonstrated that only trivial amounts of aqueous phase evaporation could influence on the activities of the biological samples. Although the contact line of the aqueous droplets was maintained well on a solid surface, it was observed that the activity or dynamics is sensitive to a slight amount of aqueous solution evaporation.

Figure 25:
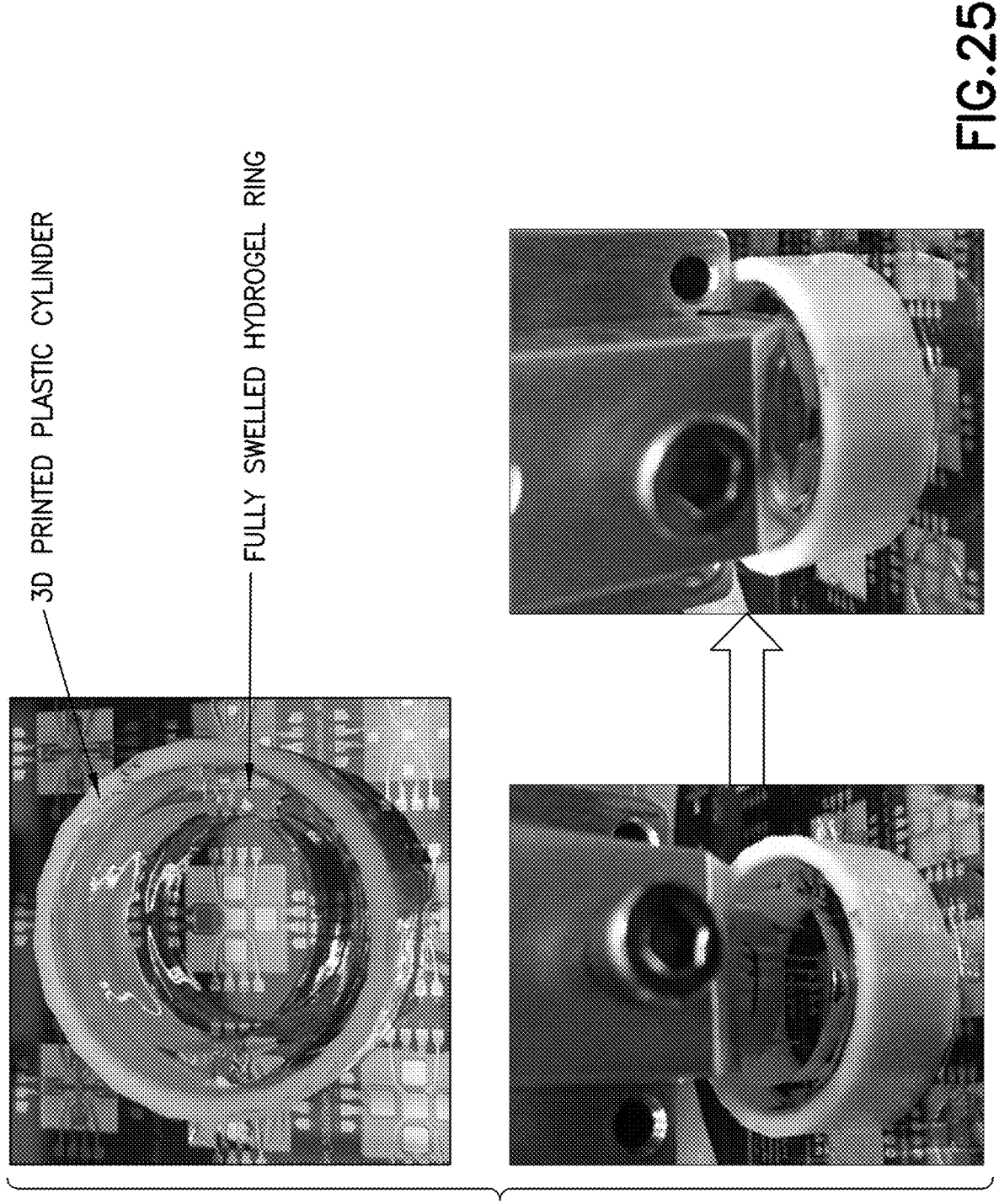
FIG. 25 illustrates an additional system for measuring evaporation-sensitive biological samples by placing a plastic cylinder to seal the outer free surface of a hydrogel cylinder, according to an embodiment of the present invention.

FIG. 25 depicts additional systems for measuring evaporation-sensitive biological samples and resulting long term activation of evaporation sensitive biological samples. The first step was to increase the volume of oil covering the liquid droplet. In particular, by considering sample or reference pads having a size of 1.5×1.5 mm², about 1.5 µL oil was the maximum for covering 0.5 µL volume of aqueous solution (bio-sample). Next, a plastic cylinder was prepared for sealing the outer free surface of a hydrogel cylinder. The rate of water evaporation from the hydrogel get was reduced, and vaporized water only went into the inside of the cylinder. The partial pressure of water within the control environment for measurement will, thus, be preserved at a high level for several hours (more than 8 hrs).

What is claimed is:

1. A device for quantitatively measuring the metabolic rate of a single cell comprising:
   a highly sensitive thermopile-based microcalorimetric sensor further comprising a plurality of individual sensor elements, wherein each individual sensor element comprises a membrane and a combination of at least one heating element and at least one thermopile disposed on the same membrane,
   wherein the thermopile is fabricated of a material selected from a combination of a first alloy of Copper and Nickel and a second alloy of Nickel and Chrome, or a combination of the first alloy and a third alloy of Nickel and Chrome, the thermopile-based microcalorimetric sensor provides sub nano-Watt resolution, and the sub nano-Watt resolution measures energy production and consumption in the single cell in real time.

2. The device of claim 1 wherein the first alloy is approximately 55 percent Copper and approximately 45 percent Nickel by weight, the second alloy approximately 80 percent Nickel and 20 percent Chrome by weight, and the third alloy is approximately 90% nickel and approximately 10% chromium by weight.

3. The device of claim 2, wherein the first alloy is Constantan, and the second alloy is Nichrome.

4. The device of claim 1, wherein each individual sensor element includes one centrally positioned sample loading area with a heating element disposed therein, and four separate reference loading areas disposed surrounding the sample loading area, and wherein the sample loading area and reference loading areas are disposed on the same membrane.

5. The device of claim 1, wherein each individual sensor element includes a single sample loading area and a single reference loading area, wherein the sample loading area and the reference loading area are each provided with heating elements, and wherein the sample loading area and reference loading area are disposed on the same membrane.

6. The device of claim 1, wherein each individual sensor element includes one centrally positioned reference loading area with four separate sample loading areas disposed surrounding the reference loading area, and wherein the sample loading areas and reference loading area are disposed on the same membrane.

7. The device of claim 1, wherein the heating elements are configured to enable scanning measurements.

8. The device of claim 1, wherein the sensor is calibrated by providing a direct link between an input power and a thermopile output.

9. The device of claim 1, wherein the at least one heating element is serpentine shaped and is disposed within the sample loading area.

10. The device of claim 1, wherein the thermopile-based microcalorimetric sensor provides tens of pico-Watt resolution.

* * * * *